(12) United States Patent
Huang

(10) Patent No.: US 12,483,313 B2
(45) Date of Patent: Nov. 25, 2025

(54) METHOD AND APPARATUS FOR TRANSMITTING USER EQUIPMENT TRIGGERED REPORT IN A WIRELESS COMMUNICATION SYSTEM

(71) Applicant: ASUS Technology Licensing Inc., Taipei (TW)

(72) Inventor: Chun-Wei Huang, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/096,195

(22) Filed: Mar. 31, 2025

(65) Prior Publication Data

US 2025/0309964 A1 Oct. 2, 2025

Related U.S. Application Data

(60) Provisional application No. 63/572,718, filed on Apr. 1, 2024.

(51) Int. Cl.
| | | |
|---|---|---|
| *H04B 7/06* | (2006.01) | |
| *H04B 17/318* | (2015.01) | |
| *H04W 24/10* | (2009.01) | |
| *H04W 72/21* | (2023.01) | |

(52) U.S. Cl.
CPC ......... *H04B 7/0626* (2013.01); *H04B 17/328* (2023.05); *H04W 24/10* (2013.01); *H04W 72/21* (2023.01)

(58) Field of Classification Search
CPC ... H04B 7/0626; H04B 17/328; H04W 24/10; H04W 72/21; H04L 5/0051; H04L 5/0055; H04L 1/1812; H04L 1/1854; H04L 1/1887; H04L 1/1896

See application file for complete search history.

(56) References Cited

U.S. PATENT DOCUMENTS

| | | | |
|---|---|---|---|
| 2024/0214854 A1 | 6/2024 | Yuan et al. | |
| 2024/0235638 A1* | 7/2024 | Lee | H04W 72/21 |
| 2024/0396607 A1* | 11/2024 | Hindy | H04L 1/0026 |
| 2024/0430068 A1* | 12/2024 | Khoshnevisan | H04W 72/0446 |
| 2025/0024294 A1 | 1/2025 | Zhu et al. | |

FOREIGN PATENT DOCUMENTS

CN 119325109 A 1/2025

OTHER PUBLICATIONS

ZTE Moderator, "Moderator Summary #3 on UE-initiated/event-driven beam management", 3GPP TSG RAN WG1 #116, R1-2401787, Feb. 26-Mar. 1, 2024. 11 pages (Year: 2024).*

(Continued)

*Primary Examiner* — Brian T O Connor
(74) *Attorney, Agent, or Firm* — Skaar Ulbrich Macari, P.A.

(57) ABSTRACT

Methods, systems, and apparatuses are provided for transmitting User Equipment (UE) triggered reports in a wireless communication system, wherein a method of a UE comprises receiving a plurality of Channel State Information (CSI) report configurations associated with a UE-initiated report, generating a first UE-initiated report if a condition of a first event is satisfied, transmitting a Pre-Notification (PN) on a first Uplink (UL) resource, and transmitting the first UE-initiated report on a second UL resource.

20 Claims, 14 Drawing Sheets

(56) References Cited

OTHER PUBLICATIONS

Nokia, Nokia Shanghai Bell; Summary on email discussion on Netw_Energy_NR; 3GPP TSG RAN WG1 Meeting #114; R1-230xxxx; Aug. 21-25, 2023; 9 pages.

Moderator (ZTE); Moderator Summary #3 on UE-initiated/event-driven beam management; 3GPP TSG RAN WG1 #116; R1-2401787; Feb. 26-Mar. 1, 2024; 11 pages.

* cited by examiner

METHOD AND APPARATUS FOR TRANSMITTING USER EQUIPMENT TRIGGERED REPORT IN A WIRELESS COMMUNICATION SYSTEM

CROSS-REFERENCE TO RELATED APPLICATIONS

The present Application claims priority to and the benefit of U.S. Provisional Patent Application Ser. No. 63/572,718, filed Apr. 1, 2024, which is fully incorporated herein by reference.

FIELD

This disclosure generally relates to wireless communication networks and, more particularly, to a method and apparatus for transmitting User Equipment (UE) triggered reports in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for transmitting User Equipment (UE) triggered reports in a wireless communication system.

In various embodiments, a method of a UE comprises receiving a plurality of Channel State Information (CSI) report configurations associated with a UE-initiated report, wherein each CSI report configuration is associated with one event, a first Uplink (UL) resource or a first resource Identification (ID), and a second UL resource or a second resource ID, and wherein the plurality of CSI report configurations are associated with a same first UL resource, generating a UE-initiated report if a condition of a first event is satisfied, wherein the first event is associated with a CSI report configuration among the plurality of CSI report configurations and the UE-initiated report comprises information indicating the CSI report configuration, transmitting a Pre-Notification (PN) on the first UL resource, and transmitting the UE-initiated report on the second UL resource.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1]3GPP TS 38.331 V17.3.0 (2022-12) 3rd Generation Partnership Project; Technical Specification Group Radio Access Network; NR; Radio Resource Control (RRC) protocol specification (Release 17); [2]3GPP TS 38.214 V17.3.0 (2022-09) 3rd Generation Partnership Project; Technical Specification Group Radio Access Network; NR; Physical layer procedures for data (Release 17); and [3] Chair notes RAN1 #116 eom0. The standards and documents listed above are hereby expressly and fully incorporated herein by reference in their entirety.

Figure 1:
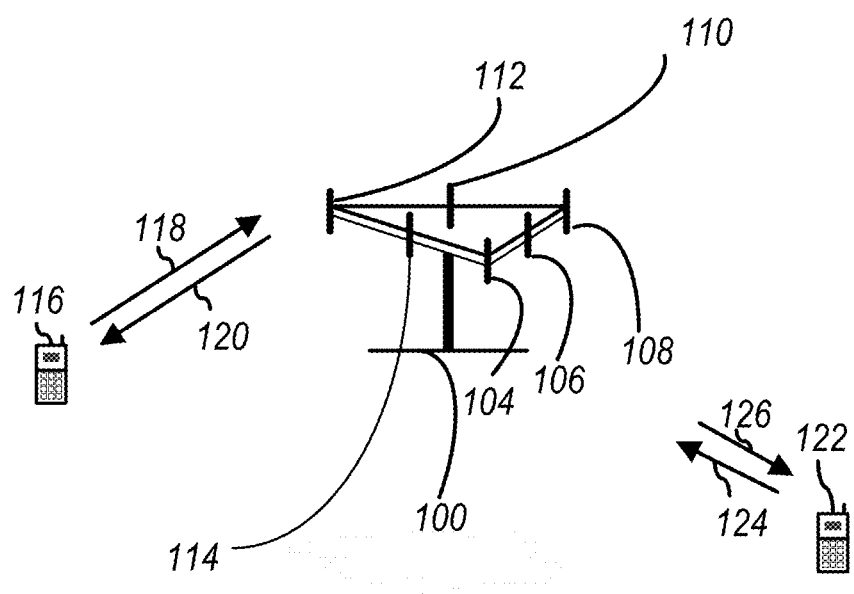
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
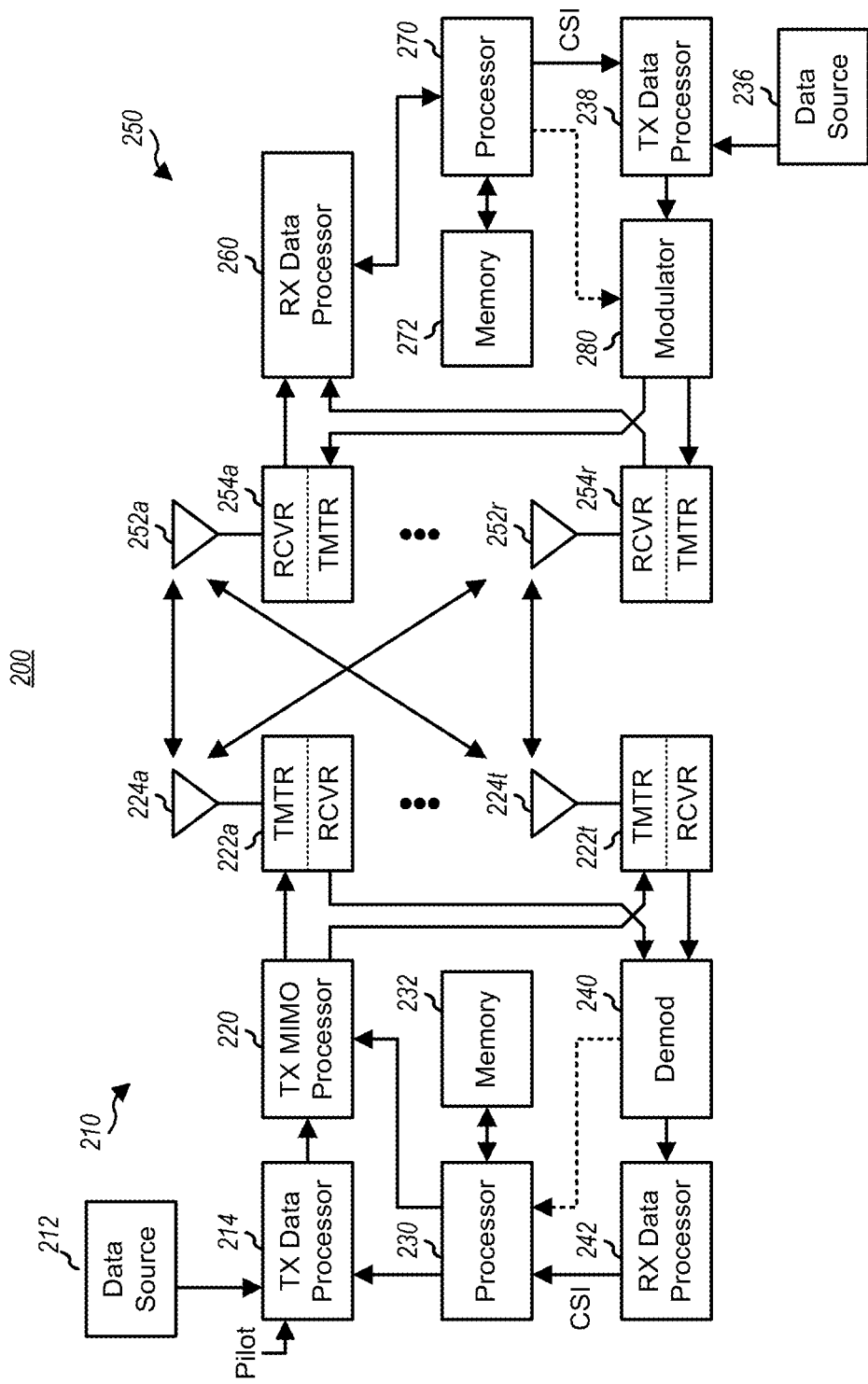
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
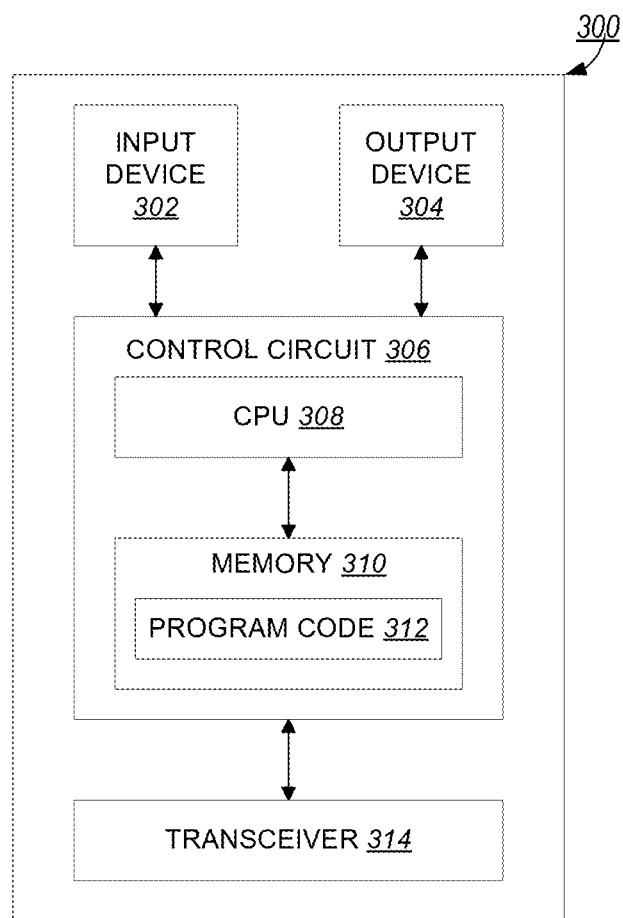
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
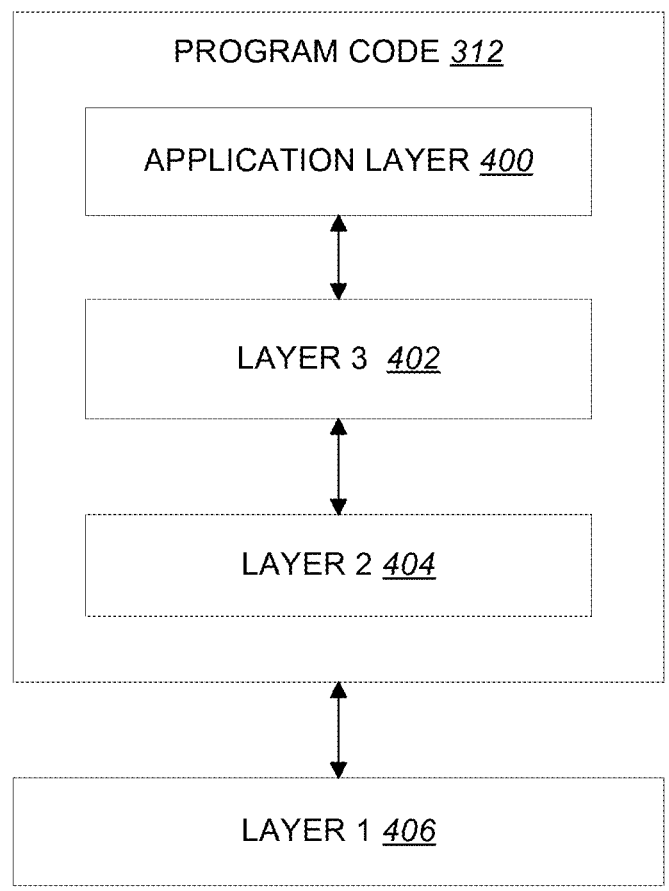
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In [1] 3GPP TS 38.331 V17.3.0 (2022-12), related information element is quoted below:

CSI-MeasConfig

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. See also TS 38.214 [19], clause 5.2.

CSI-MeasConfig information element

```
-- ASN1START
-- TAG-CSI-MEASCONFIG-START
CSI-MeasConfig ::=              SEQUENCE {
    nzp-CSI-RS-ResourceToAddModList     SEQUENCE (SIZE (1..maxNrofNZP-CSI-RS-Resources)) OF NZP-CSI-
RS-Resource   OPTIONAL, -- Need N
    nzp-CSI-RS-ResourceToReleaseList    SEQUENCE (SIZE (1..maxNrofNZP-CSI-RS-Resources)) OF NZP-CSI-
RS-ResourceId OPTIONAL, -- Need N
    nzp-CSI-RS-ResourceSetToAddModList  SEQUENCE (SIZE (1..maxNrofNZP-CSI-RS-ResourceSets)) OF NZP-
CSI-RS-ResourceSet
OPTIONAL, -- Need N
    nzp-CSI-RS-ResourceSetToReleaseList SEQUENCE (SIZE (1..maxNrofNZP-CSI-RS-ResourceSets)) OF NZP-
CSI-RS-ResourceSetId
OPTIONAL, -- Need N
    csi-SSB-ResourceSetToAddModList     SEQUENCE (SIZE (1..maxNrofCSI-SSB-ResourceSets)) OF CSI-SSB-
ResourceSet  OPTIONAL, -- Need N
    csi-SSB-ResourceSetToReleaseList    SEQUENCE (SIZE (1..maxNrofCSI-SSB-ResourceSets)) OF CSI-SSB-
ResourceSetId OPTIONAL, -- Need N
    csi-ResourceConfigToAddModList      SEQUENCE (SIZE (1..maxNrofCSI-ResourceConfigurations)) OF
CSI-ResourceConfig
OPTIONAL, -- Need N
```

| CSI-MeasConfig information element |  |
| --- | --- |
| csi-ResourceConfigToReleaseList CSI-ResourceConfigId OPTIONAL, -- Need N | SEQUENCE (SIZE (1..maxNrofCSI-ResourceConfigurations)) OF |
| csi-ReportConfigToAddModList ReportConfig   OPTIONAL, -- Need N | SEQUENCE (SIZE (1..maxNrofCSI-ReportConfigurations)) OF CSI- |
| csi-ReportConfigToReleaseList ReportConfigId OPTIONAL, -- Need N | SEQUENCE (SIZE (1..maxNrofCSI-ReportConfigurations)) OF CSI- |
| reportTriggerSize OPTIONAL, -- Need M | INTEGER (0..6) |
| aperiodicTriggerStateList OPTIONAL, -- Need M ..., [[ ]], [[ ]] } -- TAG-CSI-MEASCONFIG-STOP -- ASN1STOP | SetupRelease { CSI-AperiodicTriggerStateList } |

| CSI-MeasConfig field descriptions |
| --- |
| aperiodicTriggerStateList Contains trigger states for dynamically selecting one or more aperiodic and semi-persistent reporting configurations and/or triggering one or more aperiodic CSI-RS resource sets for channel and/or interference measurement (see TS 38.214 [19], clause 5.2.1). csi-ReportConfigToAddModList Configured CSI report settings as specified in TS 38.214 [19] clause 5.2.1.1. csi-ResourceConfigToAddModList Configured CSI resource settings as specified in TS 38.214 [19] clause 5.2.1.2. csi-SSB-ResourceSetToAddModList |

| CSI-MeasConfig field descriptions |
| --- |
| Pool of CSI-SSB-ResourceSet which can be referred to from CSI-ResourceConfig. nzp-CSI-RS-ResourceSetToAddModList Pool of NZP-CSI-RS-ResourceSet which can be referred to from CSI-ResourceConfig or from MAC CEs. nzp-CSI-RS-ResourceToAddModList Pool of NZP-CSI-RS-Resource which can be referred to from NZP-CSI-RS-ResourceSet. |

CSI-ResourceConfig

The IE CSI-ResourceConfig defines a group of one or more NZP-CSI-RS-ResourceSet, CSI-IM-ResourceSet and/or CSI-SSB-ResourceSet.

| CSI-ResourceConfig information element |
| --- |
| -- ASN1START -- TAG-CSI-RESOURCECONFIG-START CSI-ResourceConfig ::=        SEQUENCE {    csi-ResourceConfigId           CSI-ResourceConfigId,    csi-RS-ResourceSetList         CHOICE {      nzp-CSI-RS-SSB                SEQUENCE {        nzp-CSI-RS-ResourceSetList    SEQUENCE (SIZE (1..maxNrofNZP-CSI-RS-ResourceSetsPerConfig)) OF NZP-CSI-RS-ResourceSetId OPTIONAL, -- Need R        csi-SSB-ResourceSetList       SEQUENCE (SIZE (1..maxNrofCSI-SSB-ResourceSetsPerConfig)) OF CSI-SSB-ResourceSetId OPTIONAL -- Need R      },      csi-IM-ResourceSetList         SEQUENCE (SIZE (1..maxNrofCSI-IM-ResourceSetsPerConfig)) OF CSI-IM-ResourceSetId    },    bwp-Id                         BWP-Id,    resourceType                   ENUMERATED { aperiodic, semiPersistent, periodic },    ...,    [[    csi-SSB-ResourceSetListExt-r17       CSI-SSB-ResourceSetId OPTIONAL -- Need R    ]] } -- TAG-CSI-RESOURCECONFIG-STOP -- ASN1STOP |

| CSI-ResourceConfig field descriptions |
|---|
| bwp-Id<br>The DL BWP which the CSI-RS associated with this CSI-ResourceConfig are located in (see TS 38.214 [19], clause 5.2.1.2.<br>csi-IM-ResourceSetList<br>List of references to CSI-IM resources used for CSI measurement and reporting in a CSI-RS resource set. Contains up to maxNrofCSI-IM-ResourceSetsPerConfig resource sets if resource Type is 'aperiodic' and 1 otherwise (see TS 38.214 [19], clause 5.2.1.2).<br>csi-ResourceConfigId<br>Used in CSI-ReportConfig to refer to an instance of CSI-ResourceConfig.<br>csi-SSB-ResourceSetList, csi-SSB-ResourceSetListExt<br>List of references to SSB resources used for CSI measurement and reporting in a CSI-RS resource set (see TS 38.214 [19], clause 5.2.1.2).<br>nzp-CSI-RS-ResourceSetList<br>List of references to NZP CSI-RS resources used for beam measurement and reporting in a CSI-RS resource set. |

| CSI-ResourceConfig field descriptions |
|---|
| If resourceType is set to 'aperiodic', the network configures up to maxNrofNZP-CSI-RS-ResourceSetsPerConfig resource sets.<br>resource Type<br>Time domain behavior of resource configuration (see TS 38.214 [19], clause 5.2.1.2). It does not apply to resources provided in the csi-SSB-ResourceSetList. |

CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

| CSI-ReportConfig information element |
|---|
| ```
-- ASN1START
-- TAG-CSI-REPORTCONFIG-START
CSI-ReportConfig ::=            SEQUENCE {
    reportConfigId                  CSI-ReportConfigId,
    carrier                         ServCellIndex                                   OPTIONAL, -- Need S
    resourcesForChannelMeasurement  CSI-ResourceConfigId,
    csi-IM-ResourcesForInterference CSI-ResourceConfigId,                           OPTIONAL, -- Need R
    nzp-CSI-RS-ResourcesForInterference CSI-ResourceConfigId,                       OPTIONAL, -- Need R
    reportConfigType                CHOICE {
        periodic                        SEQUENCE {
            reportSlotConfig                CSI-ReportPeriodicityAndOffset,
            pucch-CSI-ResourceList          SEQUENCE (SIZE (1..maxNrofBWPs)) of PUCCH-CSI-Resource
        },
        semiPersistentOnPUCCH           SEQUENCE {
            reportSlotConfig                CSI-ReportPeriodicityAndOffset,
            pucch-CSI-ResourceList          SEQUENCE (SIZE (1..maxNrofBWPs) ) OF PUCCH-CSI-Resource
        },
        semiPersistentOnPUSCH           SEQUENCE {
            reportSlotConfig                ENUMERATED {sl5, sl10, sl20, sl40, sl80, sl160, sl320},
            reportSlotOffsetList            SEQUENCE (SIZE (1..maxNrofUL-Allocations)) OF INTEGER(0..32),
            p0alpha                         P0-PUSCH-AlphaSetId
        },
        aperiodic                       SEQUENCE {
            reportSlotOffsetList            SEQUENCE (SIZE (1..maxNrofUL-Allocations)) OF INTEGER (0..32)
        }
    },
    reportQuantity                  CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCSI          ENUMERATED {n2, n4}
        }                                                                           OPTIONAL -- Need S
        },
        cri-RI-CQI                      NULL,
        cri-RSRP                        NULL,
        ssb-Index-RSRP                  NULL,
        cri-RI-LI-PMI-CQI               NULL
    },
}                                                                                   OPTIONAL, -- Need R
    timeRestrictionForChannelMeasurements       ENUMERATED {configured, notConfigured},
    timeRestrictionFor InterferenceMeasurements ENUMERATED {configured, notConfigured},
    codebookConfig                              CodebookConfig
                                                                                    OPTIONAL, -- Need R
    aperiodic-v1610                 SEQUENCE {
        reportSlotOffsetListDCI-0-2-r16 SEQUENCE (SIZE (1..maxNrofUL-Allocations-r16)) OF INTEGER (0..32) OPTIONAL, -- Need R
``` |

| CSI-ReportConfig information element |
| --- |
| ```
        reportSlotOffsetListDCI-0-1-r16    SEQUENCE (SIZE (1..maxNrofUL-Allocations-r16)) OF
INTEGER (0..32) OPTIONAL -- Need R
      }
OPTIONAL, -- Need R
      reportQuantity-r16              CHOICE {
        cri-SINR-r16                  NULL,
        ssb-Index-SINR-r16            NULL
      }
OPTIONAL, -- Need R
      aperiodic-v1720                 SEQUENCE {
        reportSlotOffsetList-r17      SEQUENCE (SIZE (1..maxNrofUL-Allocations-r16)) OF
INTEGER (0..128) OPTIONAL, -- Need R
        reportSlotOffsetListDCI-0-2-r17  SEQUENCE (SIZE (1..maxNrofUL-Allocations-r16)) OF
INTEGER (0..128) OPTIONAL, -- Need R
        reportSlotOffsetListDCI-0-1-r17  SEQUENCE (SIZE (1..maxNrofUL-Allocations-r16)) OF
INTEGER (0..128 ) OPTIONAL -- Need R
      }
OPTIONAL -- Need R
    ]],
    [[
}
CSI-ReportPeriodicityAndOffset ::= CHOICE {
      slots4                          INTEGER (0..3)
      slots5                          INTEGER (0..4),
      slots8                          INTEGER (0..7),
      slots10                         INTEGER (0..9),
      slots16                         INTEGER (0..15),
      slots20                         INTEGER (0..19),
      slots40                         INTEGER (0..39),
      slots80                         INTEGER (0..79),
      slots160                        INTEGER (0..159),
      slots320                        INTEGER (0..319)
}
}
-- TAG-CSI-REPORTCONFIG-STOP
-- ASN1STOP
``` |

| CSI-ReportConfig field descriptions |
| --- |
| carrier<br>Indicates in which serving cell the CSI-ResourceConfig indicated below are to be found. If the field is absent, the resources are on the same serving cell as this report configuration.<br>nrofReportedRS<br>The number (N) of measured RS resources to be reported per report setting in a non-group-based report. N <= N_max, where N_max is either 2 or 4 depending on UE capability. (see TS 38.214 [19], clause 5.2.1.4) When the field is absent the UE applies the value 1.<br>reportConfigType<br>Time domain behavior of reporting configuration.<br>reportFreqConfiguration<br>Reporting configuration in the frequency domain. (see TS 38.214 [19], clause 5.2.1.4).<br>reportQuantity<br>The CSI related quantities to report. see TS 38.214 [19], clause 5.2.1. If the field reportQuantity-r16 or reportQuantity-r17 is present, UE shall ignore reportQuantity (without suffix). Network does not configure reportQuantity-r17 together with |

| CSI-ReportConfig field descriptions |
| --- |
| reportQuantity-r16.<br>reportSlotConfig<br>Periodicity and slot offset (see TS 38.214 [19], clause 5.2.1.4). If the field reportSlotConfig-v1530 is present, the UE shall ignore the value provided in reportSlotConfig (without suffix).<br>resourcesForChannelMeasurement<br>Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.<br>timeRestrictionForChannelMeasurements<br>Time domain measurement restriction for the channel (signal) measurements (see TS 38.214 [19], clause 5.2.1.1). |

CSI-ReportConfigId

The IE CSI-ReportConfigId is used to identify one CSI-ReportConfig.

| CSI-ReportConfigId information element |
| --- |
| ```
-- ASN1START
-- TAG-CSI-REPORTCONFIGID-START
CSI-ReportConfigId ::=            INTEGER (0..maxNrofCSI-ReportConfigurations-1)
-- TAG-CSI-REPORTCONFIGID-STOP
-- ASN1STOP
``` |

CSI-SSB-ResourceSet

The IE CSI-SSB-ResourceSet is used to configure one SS/PBCH block resource set which refers to SS/PBCH as indicated in ServingCellConfigCommon and ServingCellConfig.

| CSI-SSB-ResourceSet information element |
|---|
| -- ASN1START<br>-- TAG-CSI-SSB-RESOURCESET-START<br>CSI-SSB-ResourceSet ::=  SEQUENCE {<br>  csi-SSB-ResourceSetId       CSI-SSB-ResourceSetId,<br>  csi-SSB-ResourceList        SEQUENCE (SIZE(1..maxNrofCSI-SSB-ResourcePerSet)) OF SSB-Index,<br>  ...,<br>  ]]<br>}<br>ServingAdditionalPCIIndex-r17 ::=  INTEGER(0..maxNrofAdditionalPCI-r17)<br>-- TAG-CSI-SSB-RESOURCESET-STOP<br>-- ASN1STOP |

NZP-CSI-RS-Resource

The IE NZP-CSI-RS-Resource is used to configure Non-Zero-Power (NZP) CSI-RS transmitted in the cell where the IE is included, which the UE may be configured to measure on (see TS 38.214 [19], clause 5.2.2.3.1). A change of configuration between periodic, semi-persistent or aperiodic for an NZP-CSI-RS-Resource is not supported without a release and add.

| NZP-CSI-RS-Resource information element |
|---|
| -- ASN1START<br>-- TAG-NZP-CSI-RS-RESOURCE-START<br>NZP-CSI-RS-Resource ::=       SEQUENCE<br>  nzp-CSI-RS-ResourceId         NZP-CSI-RS-ResourceId,<br>  resourceMapping               CSI-RS-ResourceMapping,<br>  periodicityAndOffset          CSI-ResourcePeriodicityAndOffset     OPTIONAL, -- Cond PeriodicOrSemiPersistent<br>  qcl-InfoPeriodicCSI-RS        TCI-StateId                          OPTIONAL, -- Cond Periodic<br>  ...<br>}<br>-- TAG-NZP-CSI-RS-RESOURCE-STOP<br>-- ASN1STOP |

| NZP-CSI-RS-Resource field descriptions |
|---|
| periodicityAndOffset<br>Periodicity and slot offset sl1 corresponds to a periodicity of 1 slot, sl2 to a periodicity of two slots, and so on. The corresponding offset is also given in number of slots (see TS 38.214 [19], clause 5.2.2.3.1). Network always configures the UE with a value for this field for periodic and semi-persistent NZP-CSI-RS-Resource (as indicated in CSI-ResourceConfig).<br>qcl-InfoPeriodicCSI-RS<br>For a target periodic CSI-RS, contains a reference to one TCI-State in TCI-States for providing the QCL source and QCL type. For periodic CSI-RS, the source can be SSB or another periodic-CSI-RS. Refers to the TCI-State or dl-OrJoint-TCI-State which has this value for tci-StateId and is defined in tci-StatesToAddModList or in dl-OrJointTCI-StateToAddModList in the PDSCH-Config included in the BWP-Downlink corresponding to the serving cell and to the DL BWP to which the resource belongs to (see TS 38.214 [19], clause 5.2.2.3.1).<br>resourceMapping<br>OFDM symbol location(s) in a slot and subcarrier occupancy in a PRB of the CSI-RS resource. |

NZP-CSI-RS-ResourceSet

The IE NZP-CSI-RS-ResourceSet is a set of Non-Zero-Power (NZP) CSI-RS resources (their IDs) and set-specific parameters.

| NZP-CSI-RS-ResourceSet information element |
| --- |
| -- ASN1START<br>-- TAG-NZP-CSI-RS-RESOURCESET-START<br>NZP-CSI-RS-ResourceSet ::=    SEQUENCE {<br>  nzp-CSI-RS-ResourceSetId        NZP-CSI-RS-ResourceSetId,<br>  nzp-CSI-RS-Resources            SEQUENCE (SIZE (1..maxNrofNZP-CSI-RS-ResourcesPerSet)) OF NZP-CSI-RS-ResourceId,<br>  repetition                      ENUMERATED { on, off }<br>OPTIONAL,    -- Need S<br>  aperiodicTriggeringOffset       INTEGER (0..6)<br>OPTIONAL,    -- Need S<br>  trs-Info                        ENUMERATED {true}<br>OPTIONAL,    -- Need R<br>  ...,<br>  [[<br>  aperiodicTriggeringOffset-r16   INTEGER (0..31)<br>OPTIONAL    -- Need S<br>  ]],<br>  [[                              OPTIONAL,    -- Need R<br>  aperiodicTriggeringOffset-r17   INTEGER (0..124)<br>OPTIONAL,    -- Need S<br>  aperiodicTriggeringOffsetL2-r17 INTEGER (0..31)<br>OPTIONAL    -- Need R<br>  ]]<br>}<br>}<br>NZP-CSI-RS-Pairing-r17 ::=      SEQUENCE {<br>  nzp-CSI-RS-ResourceId1-r17      INTEGER (1..7) ,<br>  nzp-CSI-RS-ResourceId2-r17      INTEGER (1..7)<br>}<br>-- TAG-NZP-CSI-RS-RESOURCESET-STOP<br>-- ASN1STOP |

| NZP-CSI-RS-ResourceSet field descriptions |
| --- |
| nzp-CSI-RS-Resources<br>NZP-CSI-RS-Resources associated with this NZP-CSI-RS resource set (see TS 38.214 [19], clause 5.2). For CSI, there are at most 8 NZP CSI RS resources per resource set.<br>nzp-CSI-RS-ResourceId1, nzp-CSI-RS-ResourceId2<br>The nzp-CSI-RS-ResourceId1-r17 represents the index of the NZP CSI-RS resource in Resource Group 1, and nzp-CSI-RS-ResourceId2-r17 represents the index of the NZP CSI-RS resource in Resource Group 2.<br>repetition<br>Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP, L1 SINR or "no report".<br>trs-Info<br>Indicates that the antenna port for all NZP-CSI-RS resources in the CSI-RS resource set is same. If the field is absent or released the UE applies the value false (see TS 38.214 [19], clause 5.2.2.3.1). |

In [2] 3GPP TS 38.214 V17.3.0 (2022-09), TCI state related paragraphs are quoted below.

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'typeA': {Doppler shift, Doppler spread, average delay, delay spread}
'typeB': {Doppler shift, Doppler spread}
'typeC': {Doppler shift, average delay}
'typeD': {Spatial Rx parameter}

The UE can be configured with a list of up to 128 TCIState configurations, within the higher layer parameter dl-OrJoint-TCIStateList in PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the TCIState or UL-TCIState configurations are absent in a BWP of the CC, the UE can apply the TCIState or UL-TCIState configurations from a reference BWP of a reference CC. The UE is not expected to be configured with TCI-State, SpatialRelationInfo or PUCCH-SpatialRelationInfo, except SpatialRelationInfoPos in a CC in a band, if the UE is configured with dl-OrJoint-TCIStateList or UL-TCIState in any CC in the same band.

The UE receives an activation command, as described in clause 6.1.3.14 of [10, TS 38.321] or 6.1.3.47 of [10, TS 38.321], used to map up to 8 TCI states and/or pairs of TCI states, with one TCI state for DL channels/signals and/or one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs. If the activation command maps TCIState and/or UL-TCIState to only one TCI codepoint, the UE shall apply the indicated TCIState and/or UL-TCIState to one or to a set of CCs/DL BWPs, and if applicable, to one or to a set of CCs/UL BWPs once the indicated mapping for the one single TCI codepoint is applied as described in [11, TS 38.133].

When the bwp-id or cell for QCL-TypeA/D source RS in a QCL-Info of the TCI state is not configured, the UE assumes that QCL-TypeA/D source RS is configured in the CC/DL BWP where TCI state applies.

If a UE receives a higher layer configuration of dl-OrJoint-TCIStateList with a single TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of dl-OrJoint-TCIStateList with a single TCIState or a single UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit a PUCCH with HARQ-ACK information or a PUSCH with HARQ-ACK information corresponding to the DCI carrying the TCI State indication and without DL assignment, or corresponding to the PDSCH scheduled by the DCI carrying the TCI State indication, and if the indicated TCI State is different from the previously indicated one, the indicated DLorJointTCIState or UL-TCIstate should be applied starting from the first slot that is at least beamAppTime symbols after the last symbol of the PUCCH or the PUSCH. The first slot and the beamAppTime symbols are both determined on the active BWP with the smallest SCS among the active BWP(s) of the carrier(s) applying the beam indication.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $$n + 3N_{slot}^{subframe,\mu} + \frac{2^\mu}{2^{\mu K_{mac}}} \cdot k_{mac}$$

where μ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided.

If a UE is configured with the higher layer parameter tci-PresentInDCI that is set as 'enabled' for the CORESET scheduling a PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORESET.

5.1.6.1.2 CSI-RS for L1-RSRP and L1-SINR Computation

If a UE is configured with a NZP-CSI-RS-ResourceSet configured with the higher layer parameter repetition set to 'on', the UE may assume that the CSI-RS resources, described in Clause 5.2.2.3.1, within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

If the UE is configured with a CSI-ReportConfig with reportQuantity set to 'cri-RSRP', 'cri-SINR' or 'none' and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set. If the UE is configured with the CSI-RS resource in the same OFDM symbol(s) as an SS/PBCH block, the UE may assume that the CSI-RS and the SS/PBCH block are quasi co-located with 'typeD' if 'typeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

5.2.1.4.3 L1-RSRP Reporting

For L1-RSRP computation
  the UE may be configured with CSI-RS resources, SS/PBCH Block resources or both CSI-RS and SS/PBCH block resources, when resource-wise quasi co-located with 'type C' and 'typeD' when applicable.
  the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, . . . . , where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

If the higher layer parameter timeRestrictionForChannelMeasurements in CSI-ReportConfig is set to "notConfigured", the UE shall derive the channel measurements for computing L1-RSRP value reported in uplink slot n based on only the SS/PBCH or NZP CSI-RS, no later than the CSI reference resource, (defined in TS 38.211[4]) associated with the CSI resource setting.

If the higher layer parameter timeRestrictionForChannelMeasurements in CSI-ReportConfig is set to "Configured", the UE shall derive the channel measurements for computing L1-RSRP reported in uplink slot n based on only the most recent, no later than the CSI reference resource, occasion of SS/PBCH or NZP CSI-RS (defined in [4, TS 38.211]) associated with the CSI resource setting.

In [3] Chair notes RAN1 #116, the following is provided:

Agreement

On UE-initiated/event-driven beam report, at least of following aspects should be included:
  Trigger-event detection for beam reporting by UE
    UE monitors RS to assess if a beam-reporting trigger condition has been met
    FFS: Trigger condition for declaring beam-reporting event
  Beam-report transmission by UE
    Signaling contents in the beam report
    Down-selection one or more options (strive for one) between the following options as signaling medium/container for beam report transmission
      MAC-CE
      UCI
      Others are not precluded.
On UE-initiated/event-driven beam report, the following aspects may be included:
  UE requesting UL resource(s) for the beam report
  UE notifying transmission of beam report
  gNB preconfigured resources
  Other procedure(s) as required R1-2401787 Moderator Summary #3 on UE-initiated/event-driven beam management Moderator (ZTE)

Agreement

On UE-initiated/event-driven beam reporting, regarding trigger-event detection for beam reporting, RAN1 further study at least the following aspects: quality metrics, event-definition and threshold.
  Further study trigger events, including the following example as a starting point
    Event-1: Quality of the current beam is worse than a certain threshold.
    Event-2: Quality of at least one new beam, such as L1-RSRP, becomes a threshold value better than the current beam.
    Event-3: Quality of a new beam is better than a certain threshold.
    Event-4: Quality of the current beam is worse than a threshold 1, and quality of at least one new beam is better than a threshold 2.
    Others are not precluded.
  Note: Companies are encouraged to provide details on procedure (e.g. how it is used) related to their preferred event Agreement On UE-initiated/event-driven beam reporting, at least support L1-RSRP as a measurement quantity on SSB for intra-cell and inter-cell, and periodic CSI-RS for beam management
  Notes: measurement results may be contained in the beam report and/or used as quality metric(s) to initiate/trigger the reporting.
  FFS: Semi-persistent CSI-RS and aperiodic CSI-RS.
  FFS: Whether/how to support L1-SINR measurement, assuming legacy RS or RS combination (e.g., CMR only, CMR+ZP/NZP-IMR) for Rel-16 SINR is reused.
  FFS: Whether/how to specify filtering operation for L1-RSRP.

Agreement

On UE-initiated/event-driven beam reporting, regarding signaling content(s), at least support DL RS resource indicator and L1-RSRP
  FFS: Study and decide whether additional contents can be supported.
  FFS: L1-RSRP format, e.g., absolute and/or differential value.
  Note: Above does not imply to preclude discussion on L1-RSRP filtering.
  The actual reported content depends on the triggering event
    Support of one or multiple events will be discussed separately In New Radio (NR) Rel-19, phase 5 Multi-input Multi-output (MIMO) enhancement aims at User Equipment (UE)-initiated reports for beam management. According to current Radio Layer 1 (RAN1) progress, at least event-1, event-2, event-3, and event-4 could be considered. A network node could configure a UE with one or more events. One serving cell or neighboring cell could be configured with one or more events. That is if a condition of the event-i is satisfied (or the event-i is triggered), the UE will trigger to transmit a UE-initiated report and/or the UE will transmit a UE-initiated report. Based on the UE-initiated report received from a network node, the network node will indicate the UE to change an indicated/activated/configured beam (e.g., Transmission Configuration Indicator (TCI) state). Typically, content of the UE-initiated report comprises a resource indicator associated with a resource (for indicating a beam or TCI state), and/or a matrix/quality associated with the indicated resource, and/or information of the current beam's quality being worse than a threshold. Depending on the different event-i, the same or different content will be designed.

Regarding a container carrying the UE-initiated report, basically Medium Access Control (MAC) Control Element (CE) or Uplink Control Information (UCI) could be considered. MAC CE may have latency due to the need of an Uplink (UL) grant for transmitting the MAC CE. On the other hand, UCI may require a network node to configure a plurality of periodic UL resources for transmission. However, only part of them will be used by the UE for transmitting the UE-initiated report (i.e., when the condition of event is met). In order to solve this issue, Pre-Notification (PN) could be used to indicate at least usage of future one or more periodic UL resources associated with the UE-initiated report. Depending on whether to transmit the UE-initiated report on a periodic UL resource or whether to trigger the UE-initiated report or whether there is a pending UE-initiated report, the UE determines whether to transmit the PN and/or sets the PN to indicate usage of a periodic UL resource. In one example, when the UE-initiated report is not triggered or the UE will not transmit the UE-initiated report using a period UL resource or there is no pending UE-initiated report, the UE could skip transmitting the PN and/or the UE does not use the periodic UL resource. Typically, one PN could be a sequence-based signal to indicate usage of future one or more periodic UL resources. In one example the sequence-based signal could be a Sounding Reference Signal (SRS) or a Scheduling Request (SR) or Physical Uplink Control Channel (PUCCH) format 0 with different cyclic shift mapping to "used" or "not used" in an example. If there is a need to carry more information in addition to the used/not used, the PUCCH format 0 with more cyclic shift or another/other PUCCH format (e.g., PUCCH format 1, 2, 3, or 4) could be considered. Although PN could be transmitted along with a UL resource for the UE-initiated report similar to Configured Grant (CG)-UCI on a Physical Uplink Shared Channel (PUSCH) which the CG-UCI indicates usage of future CG PUSCH resources, it may not be useful due to the triggering being more dynamic instead of a periodic manner. The PN could be considered to be transmitted along with same TTI as UL resource for the UE-initiated report. The PN could be considered to be transmitted along with different TTI as UL resource for the UE-initiated report. PN could be transmitted in different OFDM symbols as UL resource. A set of contiguous OFDM symbol in a TTI could be used as PN area for carrying PN (e.g., 1-st and/or 2-nd symbol in a Transmission Time Interval (TTI) (e.g., symbol 0 and symbol 1 in a slot)). The PN area may be shared to a plurality of UEs. Alternatively in certain embodiments, the PN area could be dedicated to a UE. Alternatively in certain embodiments, one or more PNs are dedicated to the UE. Alternatively, a second one or more PNs are common to the UE. Typically, in order to have better resource efficiency in the network node, a time gap or limitation between the PN and the corresponding UL resource needs to be adopted. The time gap or limitation is used to guarantee the network node has enough time for switching and/or for other usage. However, detail design for PN is not so clear. One issue may happen when more than one events are triggered, which comprises a different type of event for one or more cells and/or a same type of event for one or more cells, it is not clear whether the UE transmits one or more PNs, and thus the relationship between the PN and UL resource needs further design. One type of event could be event-i. Assuming for one or two cell groups, even based on current Channel State Information (CSI) framework, CSI-Reportconfig configured in a Primary Cell (PCell) or a Secondary Cell (SCell) with PUCCH resources (e.g., with PUCCH for a switch between a PCell and an SCell) could have a parameter for linking one or more Reference Signals (RSs) and a serving cell which means the UE will report based on the one or more RSs on the serving cell. Besides, how to link the PN to CSI-Reportconfig may also need further design.

Throughout the present disclosure, a set of nouns or a group of nouns could comprise one or more nouns.

Throughout the present disclosure, a set of nouns and a group of nouns could be exchangeable/interchangeable.

Throughout the present disclosure, one UL resource could be associated with one PUCCH format.

Throughout the present disclosure, one UL resource could be a resource for PUSCH or a resource for PUCCH.

Throughout the present disclosure, PUSCH and PUCCH could be exchangeable/interchangeable.

Throughout the present disclosure, TTI could be replaced or be a slot, a subframe, a number of symbols, and/or a sub-slot.

Throughout the present disclosure, sub-configuration and subconfiguration are exchangeable/interchangeable.

Throughout the present disclosure, a noun using capital/non-capital, or comprising with/without hyphen could represent the same thing.

Throughout the present disclosure, Identification (ID) and ID of a noun could be replaced by each other.

Throughout the present disclosure, the concept of an association between a PN and a UE-initiated report could be replaced by PN and other pre-configure UL resource(s) for purposes different than the UE-initiated report. Preferably in certain embodiments, a purpose different than the UE-initiated report could have time-critical characteristics.

The present disclosure design an association is between a PN and an event or a configured UL resource associated with an event.

The present disclosure design is which information is indicated by a UL resource for a PN.

The present disclosure design is to solve uncertainty of the actual number of triggered events and corresponding reports.

The present disclosure design is prioritization of a PN resource for transmission or power allocation.

Concept

A UL resource for a PN and UE-initiated report is Time Division Multiplexed (TDMed) from a UL resource for UCI other than the PN and the UE-initiated report. The UL resource for the PN and the UE-initiated report is in a different TTI (e.g., different slot) from the UL resource for the UCI other than the PN and the UE-initiated report. The UL resource for the PN and the UE-initiated report is in a different TTI (e.g., different symbol) from the UL resource for the UCI other than the PN and the UE-initiated report. The UE is not required to multiplex or the UE does not multiplex the PN and the UE-initiated report with the UCI other than the PN and the UE-initiated report.

One PN is associated with one event.
One PN is associated with one UL resource.
One PN is associated with one TTI.
One PN is associated with one serving cell.
One PN is associated with one CSI-Reportconfig.
One PN is associated with a set of events.
One PN is associated with a set of UL resources.
One PN is associated with a set of TTIs.
One PN is associated with a set of serving cells.
One PN is associated with a set of CSI-Reportconfigs (e.g., one or more CSI-Reportconfigs associated with the same cell).

For a CSI-Reportconfig associated with the UE-initiated report, the CSI-Reportconfig comprises two sets of UL resources which is called a first set of UL resources and a second set of UL resources. The first set of UL resources comprise one or more first UL resources for transmitting the UE-initiated report. The second set of UL resources comprise one or more second UL resources, which is used as the PN or the carry PN associated with the first UL resource.

Alternatively in certain embodiments, CSI-Reportconfig comprises a sets of one pair of UL resources which is called a first UL resource and a second UL resource. Preferably in certain embodiments, the first UL resource is used to transmit the UE-initiated report and the second UL resource is used as the PN or the carry PN associated with the first UL resource.

Alternatively in certain embodiments, a first UL resource and a second UL resource are associated with the same UL resource ID (configured in CSI-Reportconfig) and the first UL resource and the second UL resource are configured in different TTIs. In other words, one CSI-Reportconfig configures the UE with a periodic UL occasion, and each periodic UL occasion comprises at least 2 TTIs, wherein one corresponds to the first UL resource and another corresponds to the second UL resource.

Time behavior for the first UL resource and the second UL resource is the same (e.g., periodicity, periodic). Slot offset or a starting symbol for the first UL resource and the second UL resource is different. Preferably in certain embodiments, the first UL resource and the second UL resource correspond to different UL resource IDs. Preferably in certain embodiments, there is at least a time gap between the second UL resource and the first UL resource. Preferably in certain embodiments, the first UL resource and the second UL resource are not overlapped in time domain. Preferably in certain embodiments, UL format associated with the first UL resource could be the same or different than the second UL resource. Based on an event other than event-1, the first UL resource is configured with a different UL format as the second UL resource. Based on an event being as event-1, the first UL resource could be configured with the same or different UL format as the second UL resource.

Based on an association between the PN and the UL resource for transmitting the UE-initiated report, the UE transmits the PN via a second UL resource and then transmits the UE-initiated report via a first UL resource, wherein the first UL resource is associated with the second UL resource.

When the UE needs to transmit the UE-initiated report on a first UL resource, the UE determines a second UL resource based on a characteristic of the UE-initiated report. Preferably in certain embodiments, the characteristic of the UE-initiated report could be a number of reports included in the UE-initiated report, event-i.

The UE may receive a configuration for configuring two list of UL resources, wherein (a first list of UL resources, a second list of UL resource)=>(PN+UE-initiated report, other than PN+UE-initiated report), (PN, other than PN).

For a PN area/region (in one serving cell), the UE needs to report a number of simultaneous transmitted PNs.

The PN may provide information associated with a number of triggered events or a number of cells with a triggered event. Different PNs may correspond to a different number of triggered events or a different number of cells with a triggered event.

One event is associated with one CSI-Reportconfig.

One event is associated with one sub-configuration of one CSI-Reportconfig.

One CSI-Reportconfig could comprise one or more sub-configurations (e.g., CSI-ReportSubConfig).

Based on the resource selection for the PN, a different resource to be transmitted to a network node could provide information associated with which UL resource is used for transmission. In an example, resource1, resource2, and resource3 are configured to the UE for transmitting the PN. Resources1/2/3 may associate with UL resources 1/2/3, respectively. Based on the number of bits that the UE needs (or attempts) to transmit for the UE-initiated report or based on the number of reports in the UE-initiated report that the UE needs (or attempts) to transmit, the UE will select the corresponding UL resource. The UE could be configured with a number of thresholds for determining which UL resource i for the UE-initiated report and resource i for the PN.

Based on which event or report is triggered, the UE will transmit the corresponding PN for informing usage of the UL resource for the UE-initiated report associated with the event or report. Based on which event or report is triggered, the UE determines a resource for the PN. In other words, due to one PN being associated with one event, the UE could determine a pair of resources for the PN and the UE-initiated report associated with the event.

When the UE needs (or attempts) to transmit at least one report (which is UE-initiated), the UE will transmit one PN for informing usage of the UL resource for the UE-initiated report. The one PN is associated with the at least one report (which is UE-initiated). Once the UE transmits the one PN, the UE could use a plurality of UL resources associated with the one PN. Preferably in certain embodiments, the plurality of UL resources are configured for transmitting the UE-initiated report. Preferably in certain embodiments, the plurality of UL resources are associated with one or more events and/or one or more cells and/or one or more event types.

When the UE needs (or attempts) to transmit a first report associated with a first event (or a first CSI-Reportconfig) and the UE does not need (or attempt) to transmit a second report associated with a second event (or a second CSI-Reportconfig) or a first event (or a first CSI-Reportconfig) is triggered and a second event (or a second CSI-Reportconfig) is not triggered, the UE transmits the PN via a resource associated with at least the first event and the second event.

A different resource for transmitting the PN will be used to indicate a different number of events. Preferably in certain embodiments, the number of events is associated with a pending report to be transmitted. Preferably in certain embodiments, the number of events corresponds to events that are triggered and not cancelled.

A different resource for transmitting the PN will be used to indicate a different payload of the UE-initiated report. Preferably in certain embodiments, a payload of the UE-initiated report may comprise a report/content associated with one or more triggered events. Preferably in certain embodiments, the one or more of events correspond to events that are triggered and not cancelled.

Figure 5:
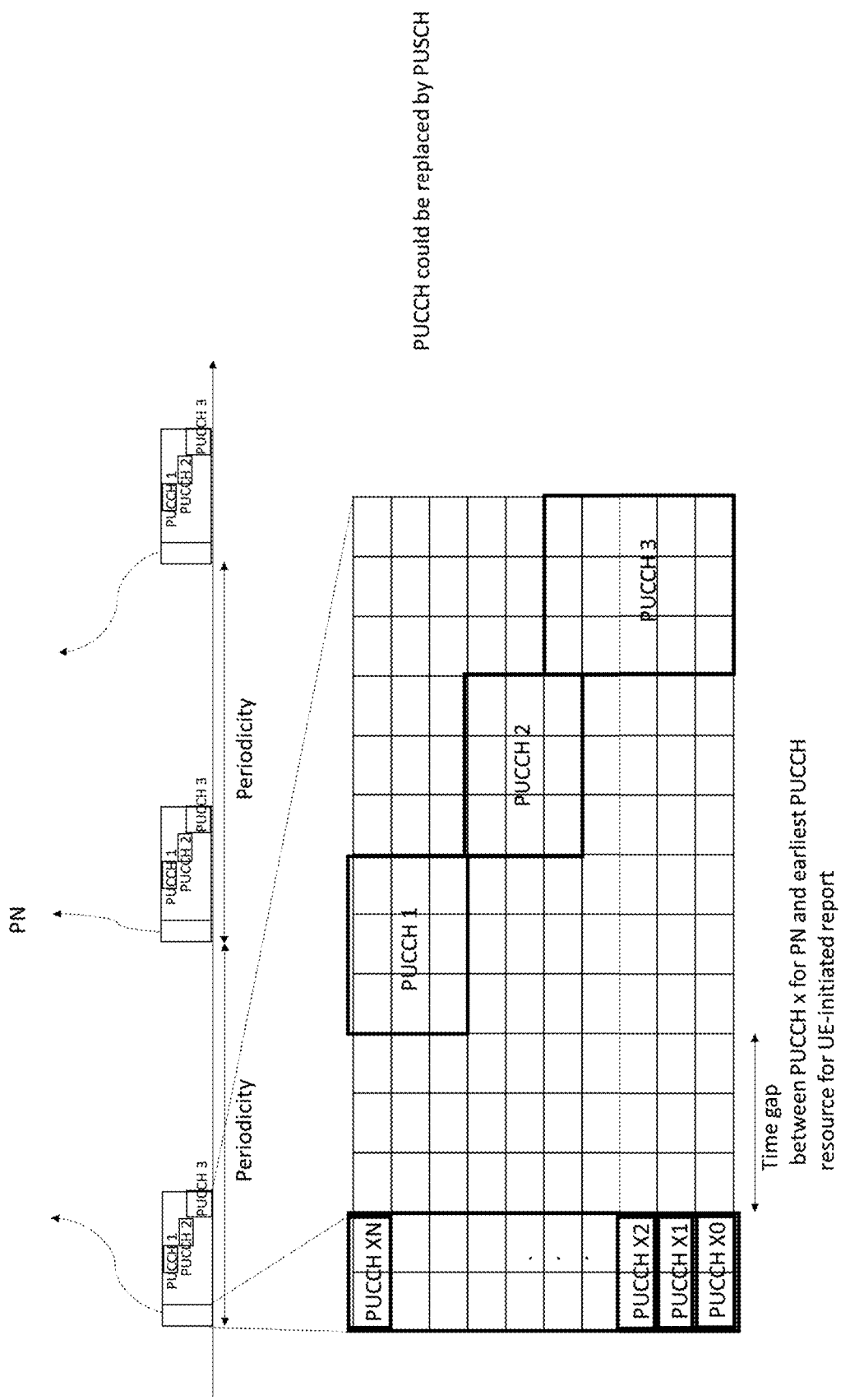
FIG. 5 is an example diagram showing PUCCH X0~PUCCH XN comprising the PN, PUCCH X0 is associated with PUCCH 1, PUCCH X1 is associated with PUCCH 2, and PUCCH X2 is associated with PUCCH 3, in accordance with embodiments of the present invention.

In one example, as shown in FIG. 5, PUCCH X0~PUCCH XN comprises the PN. PUCCH X0 is associated with PUCCH 1. PUCCH X1 is associated with PUCCH 2. PUCCH X2 is associated with PUCCH 3. In this example, a PN resource and a PUCCH resource for transmitting the UE-initiated report is one-to-one. Preferably in certain embodiments, PUCCH Xi and PUCCH Xj could be in different Physical Resource Block (PRBs) or the same PRBs. Preferably in certain embodiments, PUCCH Xi and PUCCH Xj do not overlap in frequency domain. Preferably in certain embodiments, PUCCH Xi and PUCCH Xj could be in the same frequency domain. Preferably in certain embodiments, for the same PRBs, PUCCH Xi and PUCCH Xj correspond to a different cyclic shift index. Preferably in certain embodiments, PUCCH Xi for one or more i and PUCCH I are in the same serving cell. Preferably in certain embodiments, the UE does not expect to be configured with both the UE-initiated report and a SCell for PUCCH switching. Preferably in certain embodiments, PUCCH 1, PUCCH 2, PUCCH3 are associated with triggered events "1~m–1", "m~2m–1", "2m~3m–1". Preferably in certain embodiments, PUCCH 1, PUCCH 2, PUCCH3 are associated with triggered events "1~m–1", "m~k–1", "k~p–1", or there is no upper "limit". In another example, the PN resource and the PUCCH resource for transmitting the UE-initiated report could be multiple-to-one. As the PN is used to indicate "a number of events", based on the number of triggered events, the UE would determine one PN resource for transmission. In this example, PUCCH X0~PUCCH X3 may correspond to a number of triggered events 1~4. PUCCH X0~PUCCH X3 are associated with PUCCH1. Preferably in certain embodiments, a different event may have one unified format for reporting. Although it may be unnecessary for some events, it is simple when a number of triggered events is implicitly indicated by a corresponding PN resource. Alternatively, which triggered event could be indicated as part of the information/content in a UE-initiated report. A codepoint method could be used to indicate which one triggered event. In one example, there are X resources associated with X UE-initiated events. $\log_2 \lfloor (C_1^X + C_2^X + \ldots C_X^X) \rfloor$ could be used to indicate the combination of one or more triggered events. CY corresponds to a combination operation. Each code-point will indicate information associated with which triggered event. Each code-point will indicate information associated with the number of one or more triggered events and/or which event(s). In one example, when there are 5 events, code-point 0~∝(assuming using decimal for illustration) corresponds to one triggered event and with ascending order of the event ID or CSI-reportconfigID or sub-configuraitonID.

As each TTI or slot will correspond to a different number of event(s)/CSI-Reportconfig(s) and also with a different number of actual triggered event(s)/CSI-Reportconfig(s), a semi-static method/way is used to determine the size of information for indicating the UE-initiated report or to determine the size of information for indicating the combination of triggered events. Based on a Radio Resource Control (RRC) configured with the number of event(s)/CSI-Reportconfig(s) to be transmitted in a TTI, (no matter the actual triggered events having a report to be transmitted), the UE determines the size of the information for indicating the UE-initiated report or to determine the size of the information for indicating the combination of triggered events (when at least event is triggered). Preferably in certain embodiments, when there is no event triggered, the UE does not transmit the UE-initiated report.

Preferably in certain embodiments, a UE could be configured with a plurality of CSI-reportconfigs associated with a first cell. Preferably in certain embodiments, the plurality of CSI-reportconfigs comprises a first CSI-reportconfig and a second CSI-reportconfig. Preferably in certain embodiments, both the first CSI-reportconfig and the second CSI-reportconfig are associated with the UE-initiated report or an event. Preferably in certain embodiments, each of the first CSI-reportconfig or the second CSI-reportconfig could be configured with an event ID. Preferably in certain embodiments, the first CSI-reportconfig could be associated with one or more sub-configurations, wherein each sub-configuration is associated with one event ID. Preferably in certain embodiments, both Downlink (DL) Reference Signal (RS) and serving cell information could be also provided in the first CSI-reportconfig and the second CSI-reportconfig, respectively. Preferably in certain embodiments, based on the first CSI-reportconfig associated with the UE-initiated report or an event, a UL resource for transmitting the UE-initiated report could be configured from a first set of UL resources. Preferably in certain embodiments, based on a third CSI-reportconfig is NOT associated with the UE-initiated report or an event, the UL resource for transmitting the report is configured from a second set of UL resources. Preferably in certain embodiments, the UE needs to transmit the PN before performing transmission on the UL resource among the first set of UL resources. Preferably in certain embodiments, the UE does not transmit the PN before performing transmission on the UL resource among the second set of UL resources. Preferably in certain embodiments, the first CSI-reportconfig could configure a first UL resource in a periodic manner. Preferably in certain embodiments, the second CSI-reportconfig could configure a second UL resource in aperiodic manner or semi-persistent manner. Alternatively, the UE does not expect to be configured in both an aperiodic manner and the UE-initiated report in one CSI-reportconfig. Preferably in certain embodiments, the first CSI-reportconfig could configure a first UL resource (e.g., a first resource ID). Preferably in certain embodiments, the first resource ID is among an ID set associated with the UL resource for the UE-initiated report. Preferably in certain embodiments, the second CSI-reportconfig could configure a second UL resource (e.g., a second resource ID). Preferably in certain embodiments, the first UL resource could be the same or different than the second UL resource. Preferably in certain embodiments, when the first CSI-reportconfig and the second CSI-reportconfig are configured with the same UL resource, at least an event associated with the first or the second CSI-reportconfig is triggered (and not cancelled), the UE will transmit the PN associated with the UL resource. Preferably in certain embodiments, each CSI-reportconfig could be configured with each UL resource for the UE-initiated report and preferably with the UL resource for the PN. Preferably in certain embodiments, the UL resource for the PN is associated with the UL resource. Preferably in certain embodiments, the UL resource for the PN determination could be based on an explicit configuration (e.g., UL resource ID for the PN) or implicitly derived or determined from time-domain information associated with the UL resource for the UE-initiated report (e.g., System Frame Number (SFN), subframe, slot, starting symbol, duration associated with the UL resource for the UE-initiated report), frequency-domain information associated with the UL resource for the UE-initiated report (e.g., starting PRB or frequency unit, number of PRBs or frequency units associated with the UL resource for the UE-initiated report), code-domain information associated with the UL resource for the UE-initiated report (e.g., cyclic shift index/ID associated with the UL resource for the UE-initiated report), resource format associated with the UL resource for the UE-initiated report, event ID associated with the UL resource for the UE-initiated report, content associated with the UL resource for the UE-initiated report, csi-reportconfigID, and/or subconfigurationID. Preferably in certain embodiments, the UE transmits one report associated with one event. Preferably in certain embodiments, the one event is associated with one csi-reportconfigID (and corresponding configuration), and/or one subconfigurationID (and corresponding subconfiguration). Preferably in certain embodiments, based on an explicit configuration or based on csi-reportconfigID or subconfigurationID, the UE could determine the UL resource for the PN. In one example, based on the same ID between the UL resource for the PN and the UL resource for the UE triggered report, the UE could determine the UL resource for the PN. Preferably in certain embodiments, the UL resource for the UE-initiated report could be configured by a (sub)configuration associated with the triggered event. Alternatively, the UL resource for the PN is configured along with a (sub)configuration associated with csi-reportconfigID, and/or subconfigurationID associated with the one event (e.g., there is a second PUCCH resource ID or a second PUSCH resource ID configured for the PN in addition to a first PUCCH resource ID or a first PUSCH resource ID configured for the UE-initiated report associated with the one event). Alternatively, the UL resource configured associated with an event will have a configuration or parameter to link or associate or configure a corresponding UL resource for the PN. Preferably in certain embodiments, once the UE transmits the UE-initiated report associated with the one event, based on the configuration or parameter associated with the UL resource of the one event, the UE could determine to transmit the PN on the corresponding UL resource (and the UE-initiated report on the UL resource for the UE-initiated report associated with the one event). Preferably in certain embodiments, the UL resource for the UE-initiated report associated with the one event could have one-to-one mapping to the UL resource for the PN. Preferably in certain embodiments, based on time domain, frequency domain or code-domain information associated with the UL resource for the UE-initiated report associated with the one event, the UE could determine the UL resource for the PN. Preferably in certain embodiments, based on a functionality with input of time domain, frequency domain or code-domain information associated with the UL resource for the UE-initiated report associated with the one event, the UL resource for the PN could be an output of the functionality. In one example, common information (such as symbol index, slot index, PRB index, cyclic shift index) in a serving cell (which with csi-reportconfig associated with the one event) could be used for determining the UL resource for the PN.

Preferably in certain embodiments, the UE will determine the UL resource for the PN based on an explicit configuration or based on time domain information, frequency-domain information associated with the UL resource for the UE-initiated report, code-domain information associated with the UL resource for the UE-initiated report, resource format associated with the UL resource for the UE-initiated report, event ID associated with the UL resource for the UE-initiated report, content associated with the UL resource for the UE-initiated report, csi-reportconfigID, and/or sub-configurationID. Preferably in certain embodiments, the UL resource for the PN could be one-to-one mapping to the UL resource for the UE-initiated report. In one example, the same UL resource ID between the UL resource for the PN and for the UE-initiated report could be used to configure the association between the UL resource for the PN and the UL resource for the UE-initiated report. For another example, the same linking ID in a UL resource configuration for the PN and in another UL resource configuration for the UE-initiated report could be used to configure the association between the UL resource for the PN and the UL resource for the UE-initiated report. Preferably in certain embodiments, a different cell's measurement/report/content should be configured with a different UL resource for the UE-initiated report.

Preferably in certain embodiments, the UE may apply a modulo operation when determining the UL resource ID for the PN.

Figure 9:
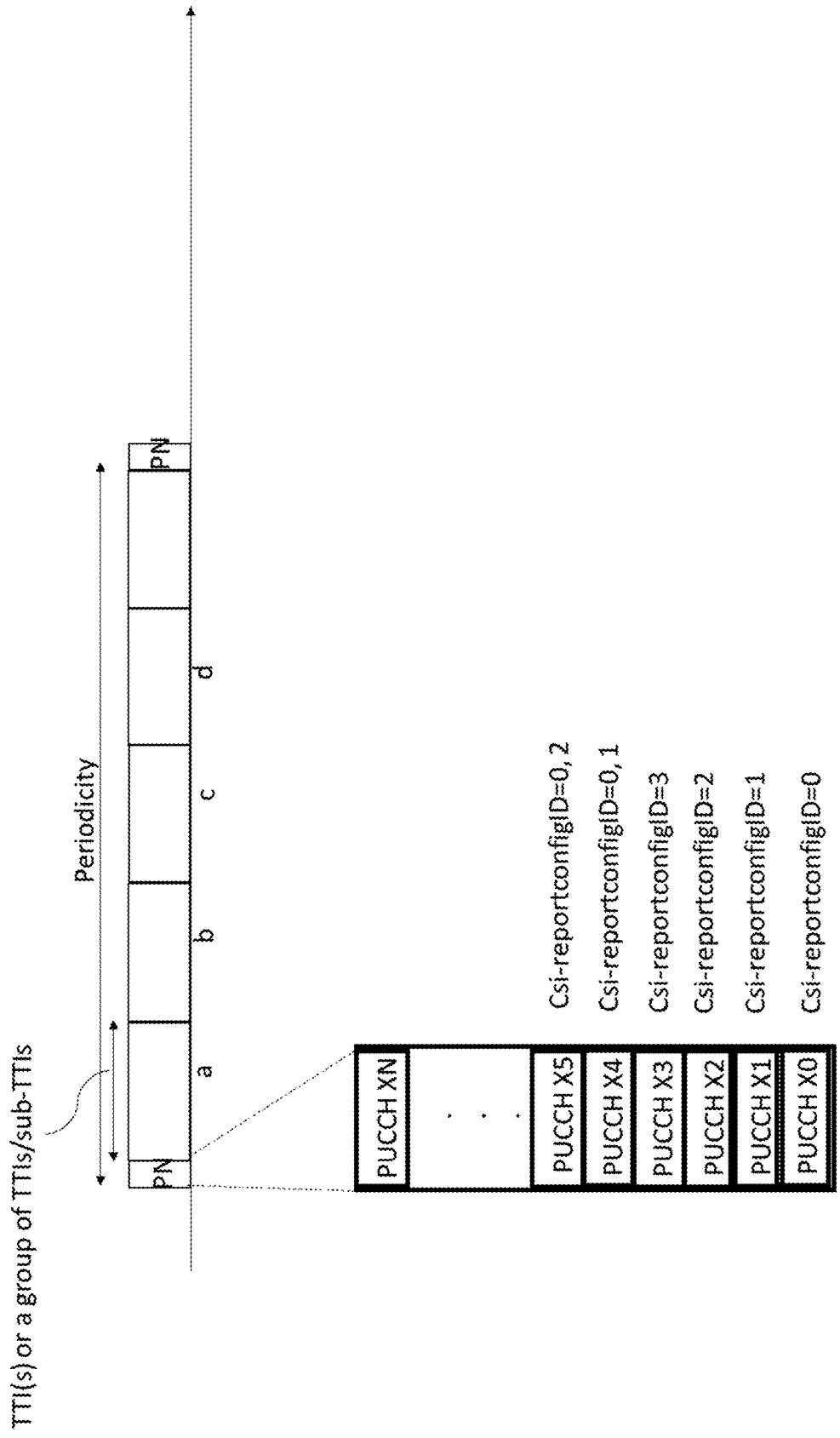
FIG. 9 is an example diagram showing slot/TTI a, b, c, d could comprise UL resource(s) for the UE-initiated report and there are 4 UE-initiated report configurations (e.g., csi-reportconfigID 0~3, or alternatively csi-reportconfigID k1, k2, k3, k4 mapping with increasing order), in accordance with embodiments of the present invention.

In one example, as shown in FIG. 9, assuming slot/TTI a, b, c, d could comprise UL resource(s) for the UE-initiated report and there are 4 UE-initiated report configurations (e.g., csi-reportconfigID 0-3, or alternatively csi-reportconfigID k1, k2, k3, k4 mapping with increasing order). PUCCH Xi for the PN is associated with increasing order of csi-reportconfigIDs followed by a number of csi-reportconfigs (and also second increasing order of csi-reportconfigIDs). For example, the UE has two triggered reports which each is associated with csi-reportconfigID 0, 2, respectively (which are both associated with UE-initiated). The UE will transmit PUCCH X5 for the PN. Based on the received PN and/or information from the PUCCH resource for the PN, the network node could have better usage for UL resource(s) not indicated as used by the UE. The semi-static way is to let each PN region associate to all UEs configured with the UE-initiated report configuration (e.g., the UE could be configured with more than 4 UE-initiated report configurations). Alternatively, the more dynamic way is to let each PN region associate to all UE-configured UE-initiated report configurations which has a configured UL resource within a time interval, and if there is no configured UL resource for one UE-initiated report configuration within a time interval, there is no need to associate the PN in a PN region to indicate usage of a configured UL resource.

Figure 10:
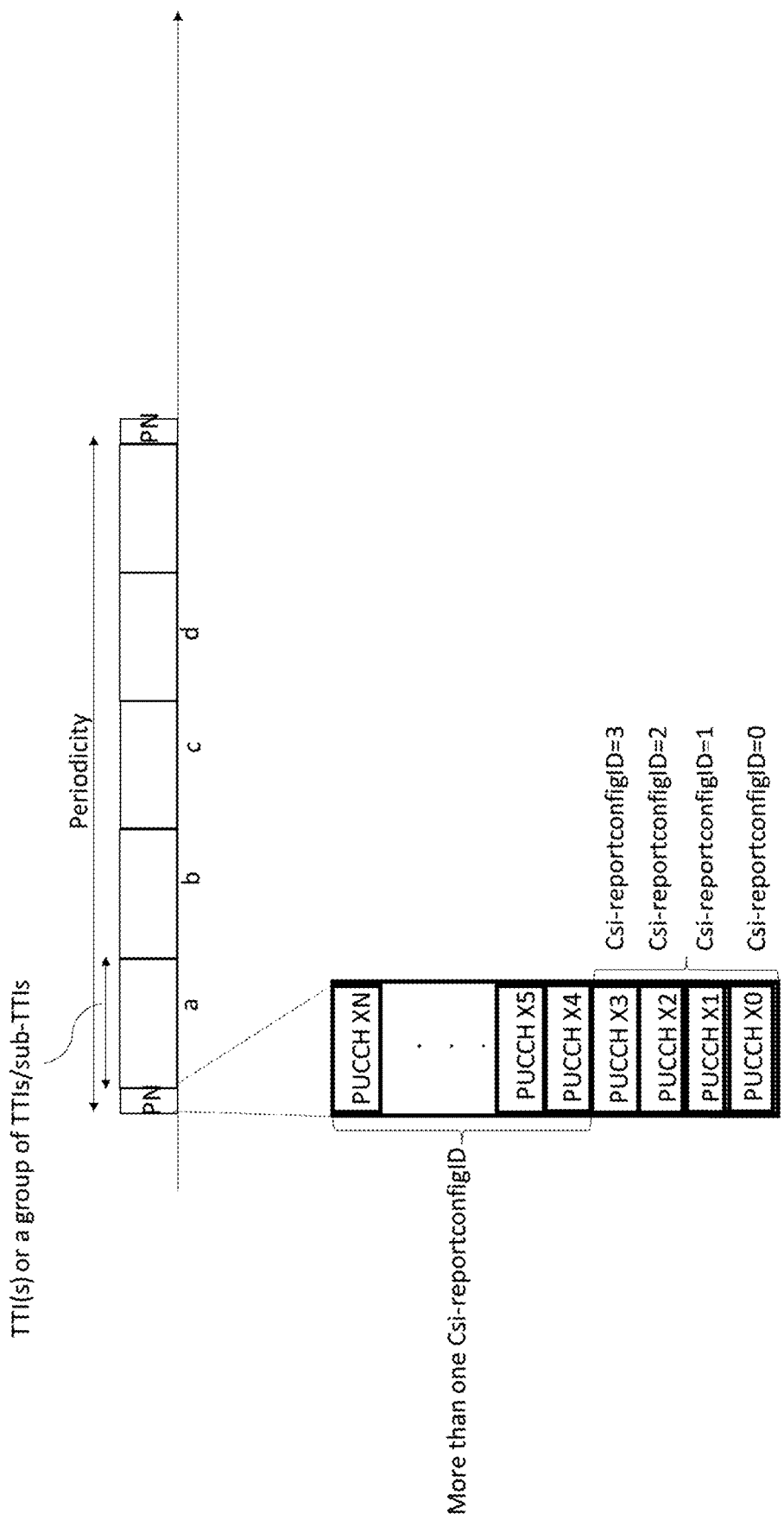
FIG. 10 is an example diagram showing, for a given PN region, PUCCH Xi could comprises two types, a first type of PUCCH could be used for indicating whether the UL resource configured in one csi-reportconfigID (or associated with one event) is used or not, and a second type of PUCCH could be used for indicating whether a second UL resource configured for multiplexing more than one csi-reportconfigIDs (or associated with more than one events) is used or not, in accordance with embodiments of the present invention.

In one example, as shown in FIG. 10, for a given PN region, PUCCH Xi could comprises two types. A first type of PUCCH could be used for indicating whether the UL resource configured in one csi-reportconfigID (or associated with one event) is used or not. A second type of PUCCH could be used for indicating whether a second UL resource configured for multiplexing more than one csi-reportconfigIDs (or associated with more than one events) is used or not. The second UL resource could be configured in TTI a, b, c, and/or d. The UL resource configured in csi-reportconfigID may not comprise information of a serving cell ID or an event ID (which both information is disclosed in the configuration of the corresponding csi-repotconfig). The second UL resource comprises information of a serving cell ID and/or an event ID and/or csi-reportconfigID. For PUCCH X4-XN in the example of FIG. 10, PUCCH Xi and PUCCH Xj may provide information such as how many numbers of triggered reports (e.g., PUCCH X4 could indicate 2, PUCCH X5 could indicate 3). Preferably in certain embodiments, for PUCCH X4-XN in the example of FIG. 10, PUCCH Xi and PUCCH Xj are associated with a different UL resource for transmitting the UE-initiated report. Preferably in certain embodiments, for PUCCH X4-XN in the example of FIG. 10, PUCCH Xi and PUCCH Xj are associated with the UL resource with a different format or configuration for transmitting the UE-initiated report. The different format or configuration could be a number of symbols of the UL resource, starting symbol, a number of TTI repetitions or aggregation factors, a number of (consecutive) PRBs, cyclic shift index, and/or whether supporting frequency hopping. In one example, PUCCH X4 could corresponds to the UL resource applied slot aggregation or repetition, and the UL resource is in slot a, b, c, and d (e.g., aggregation factor=4 or slot repetition=4, with the same format, resource allocation, but in a different slot). In another example, PUCCH X5 could correspond to the UL resource NOT applied to slot aggregation or repetition, and the UL resource is in slot a, b, c, or d. Preferably in certain embodiments, the UE does not expect to transmit both PUCCH Xi for the PN with different types in a given timing. Preferably in certain embodiments, the UE, based on whether there are more than one triggered events (having the UE-initiated report to be transmitted), determines whether to use the second type of PUCCH for the PN or use the first type of PUCCH for the PN.

Preferably in certain embodiments, when one csi-reportconfig is configured as UE-initiated, the one csi-reportconfig is not associated with network triggering.

Figure 11:
FIG. 11 is an example diagram showing that one UL resource for the PN and one UL resource for the UE-initiated report could associate with one or configured by one csi-reportconfig (associated with csi-reportconfigID=X), in accordance with embodiments of the present invention.

Preferably in certain embodiments, the UE could be configured with a region for UL resources for the PN. Preferably in certain embodiments, the region could be configured periodically. Preferably in certain embodiments, the size of each region will be different. Preferably in certain embodiments, the size of each region will link to at least one event. Preferably in certain embodiments, the size of each region will be fixed. Preferably in certain embodiments, the size of each region will be based on a number of associated events. Preferably in certain embodiments, when there are a first number of events or a csi-reportconfiguration associated with the UE-initiated report, a first size of the region for UL resources for the PN will be used. Preferably in certain embodiments, when there are a second number of events or a csi-reportconfiguration associated with the UE-initiated report, a second size of the region for UL resources for the PN will be used. Preferably in certain embodiments, the UE could be configured with PUCCH resource ID space. Preferably in certain embodiments, the region for UL resources for the PN could be configured periodically (e.g., X slot or Y ms periodicity). Preferably in certain embodiments, the region for UL resources for the PN could be used to indicate usage of UL resources in a time interval. Preferably in certain embodiments, the time interval could be between the current region to the next region. Preferably in certain embodiments, based on a maximum number of csi-reportconfigs or sub-configurations or triggered events (with the pending UE-initiated report to be transmitted), the size of the region could be determined. Preferably in certain embodiments, regardless of the actual number of csi-reportconfigs or sub-configurations, the size of each periodic region is fixed. In one example, assuming one slot will have a maximum number of UE-triggered reports (e.g., W) and periodicity of the PN region will be Z slots, the size of one PN region will be W*Z. Preferably in certain embodiments, the UL resource for one PN region should be configured as from the UL resource ID 0~W*Z−1. Preferably in certain embodiments, W may be based on the UE configured number of csi-reportconfigs or sub-configurations associated with UE-initiated. Preferably in certain embodiments, W will be determined based on the maximum number of UL resource associated with csi-reportconfig or sub-configuration associated with UE-initiated in one slot/TTI. Preferably in certain embodiments, UL resource ID 0~W−1 will be mapped to the UL resource for the UE-initiated report in an earlier slot/TTI (in a time period). Preferably in certain embodiments, UL resource ID W~2 W−1 will be mapped to the UL resource for the UE-initiated report in a second earlier slot/TTI (in a time period) and so on. Preferably in certain embodiments, briefly to say, the mapping is following an order of event index/ID or csi-reportconfigID (associated with UE-initiated) or sub-configuration (associated with UE-initiated) first followed by the slot/TTI index/ID. Preferably in certain embodiments, an association between the UL resource for the PN and the UL resource for the UE-initiated report associated with one event could be based on one-to-one mapping. Preferably in certain embodiments, the PN region is configured to be in TTI, n, n+Z, n+2Z (e.g., periodicity is Z and with starting offset as n). Preferably in certain embodiments, the time interval could be from TTI n+1~n+Z (e.g., the UL resource for the UE-initiated report is at least in a different slot later than the (associated) PN region). Alternatively, the time interval could be from TTI n~n+Z−1 (e.g., the UL resource for the UE-initiated report could be in the same slot later than the (associated) PN region). Preferably in certain embodiments, for each event or csi-reportconfig or sub-configuration, the UE could be configured with a TTI offset with respect to the UL resource for the UE-initiated report (associated with one event). For example, as shown in FIG. 11, one UL resource for the PN and one UL resource for the UE-initiated report could associate with one or configured by one csi-reportconfig (associated with csi-reportconfigID=X). Preferably in certain embodiments, the TTI offset could be configured per UE, per event, per csi-reportconfig, per sub-configuration, per UL Bandwidth Part (BWP), or per serving cell. Alternatively, slot offset of periodicity for the UL resource for the UE-initiated report could be shared to the UL resource for the PN. Preferably in certain embodiments, each periodic UL resource for the UE-initiated report will associate with one TTI with one PN resource or PN region. Preferably in certain embodiments, the UE could determine the most closed PN region for transmitting the PN in response to a triggered event. For example, as a similar example, when there is a triggered event before TTI n+Z and its corresponding UL resource is within TTI n+Z and n+2Z, the UE will transmit PN in TTI n+Z.

Figure 8:
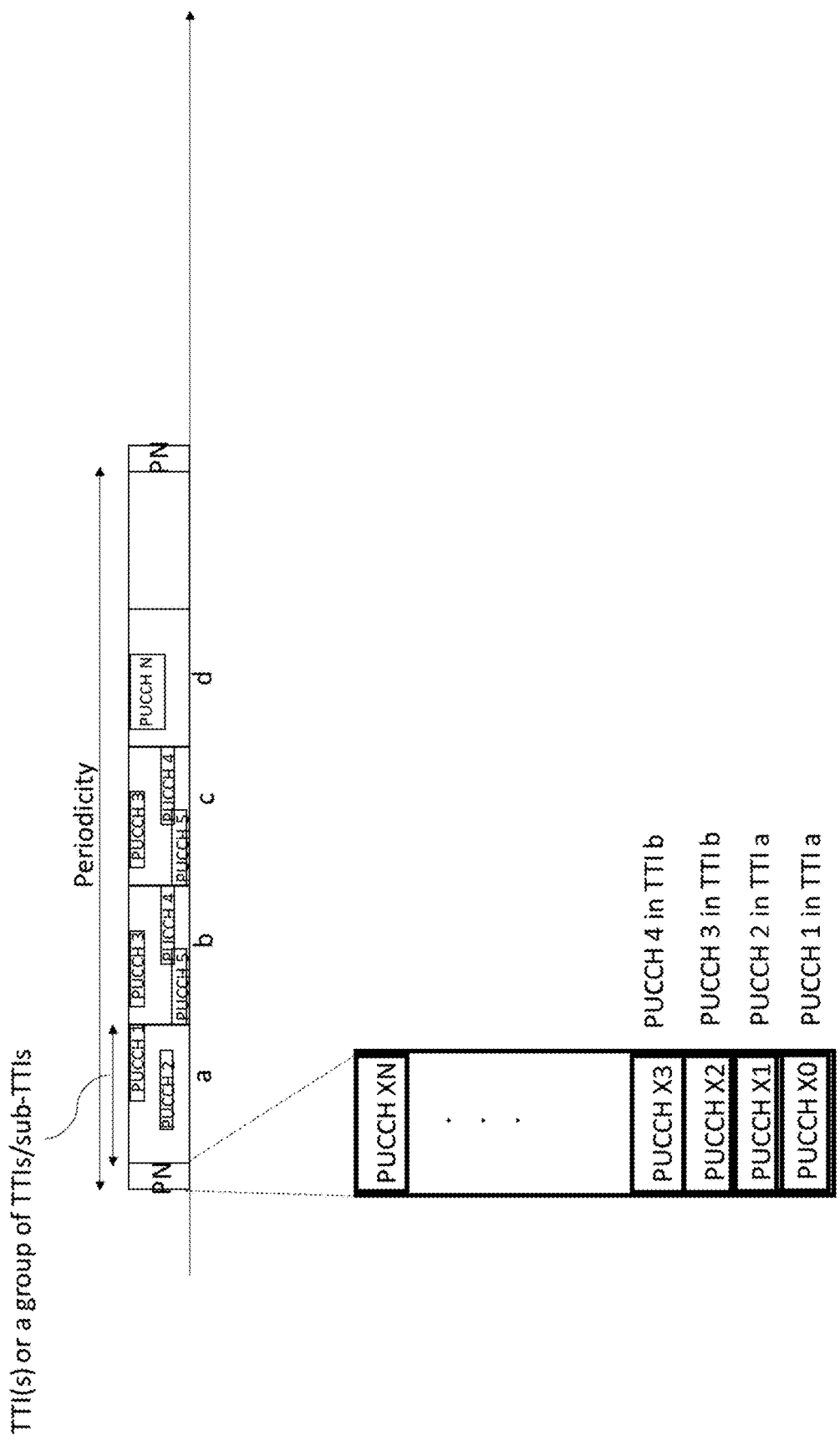
FIG. 8 is an example diagram showing each PUCCH resource in a different TTI (even with the same PUCCH resource ID) corresponds to a different csi-reportconfig or sub-configuration or event, in accordance with embodiments of the present invention.

Alternatively in certain embodiments, the UE could be configured with a plurality of UL resources for the PN associated with one or more events (or one or more csi-reportconfigs or one or more sub-configuration). Preferably in certain embodiments, the plurality of UL resources for the PN could be called as a PN region. In one example, the PN region could be configured in TTI n+Z, n+2Z, n+3Z. Size of the PN region in different periodic occasions may be the same or different. Size of PN regions in different periodic occasions may depend on how many configured UL resources associated with the event or csi-reportconfig or sub-configuration within a time interval or depend on how many events or csi-reportconfigs or sub-configurations associated with UE-initiated within a time interval. Preferably in certain embodiments, when there are two UL resources configured within a time interval (e.g., periodicity of the PN is smaller than periodicity of the UL resource associated with UE-initiated) different UL resource for the PN in a PN region could be used. For example, a first time interval associated with the PN in TTI n+Z comprises a first number of UL resources associated with events or csi-reportconfigs or sub-configurations, and a second time interval associated with the PN in TTI n+2Z comprises a second number of UL resources associated with events or csi-reportconfigs or sub-configurations. Preferably in certain embodiments, the size of a first PN region (i.e., in TTI n+Z) or ID space in the first PN region corresponds to the first number of UL resources. Preferably in certain embodiments, size of a second PN region (i.e., in TTI n+2Z) or ID space in the second PN region corresponds to the second number of UL resources. Preferably in certain embodiments, the UE does not expect periodicity of the UL resource associated with the UE-initiated report is smaller than periodicity of the UL resource for the PN. Preferably in certain embodiments, periodicity of the UL resource for the PN is restricted to be configured larger than periodicity of the UL resource associated with the UE-initiated report. Preferably in certain embodiments, the UE does not expect the same event or same csi-reportconfig or same sub-configuration associated with UE-initiated will have more than one UL resources or occasions (e.g., in a different TTI) within a time interval. Except the UE is configured with a repetition scheme (e.g., aggregationfactor or repetition number) for the UL resource for the PN, the UE expects one event or one csi-reportconfig or one sub-configuration associated with UE-initiated will have only one UL resources or occasion within a time interval. In the example of FIG. 8, PUCCH Xi for indicating used UL resource (e.g., here is using PUCCH i) could be based on increasing PUCCH resource IDs first followed by a slot index. Alternatively, the PUCCH resource ID could be replaced by csi-reportconfigID, sub-configurationID and/or serving cell ID for measurement. Preferably in certain embodiments, the UE could determine an association between PUCCH xi (for PN) and PUCCH i (for UE-initiated report) based on increasing csi-reportconfigID, sub-configurationID and/or a serving cell ID followed by a slot index. Preferably in certain embodiments, any order of csi-reportconfigID, sub-configurationID and/or serving cell ID could be used for determining order mapping to PUCCH Xi in a slot. In FIG. 8, each PUCCH resource in a different TTI (even with the same PUCCH resource ID) corresponds to a different csi-reportconfig or sub-configuration or event. Alternatively, the UE would determine PUCCH Xi based on an association between csi-reportconfigID/sub-configurationID/eventID. In this example, based on increasing order of csi-reportconfigID/sub-configurationID/eventID, the UE could determine PUCCH resource Xi. Preferably in certain embodiments, ascending/increasing order could be replaced by descending/decreasing order. More specifically, PUCCH X0~X7 could map to csi-reportconfigID 0~7 and thus the corresponding UL resource (e.g., PUCCH j in slot a/b/c/d). Preferably in certain embodiments, as shown in FIG. 8, PUCCH i and PUCCH j in the same slot should follow a restriction of time gap to the PN region. Preferably in certain embodiments, PUCCH i and PUCCH j does not overlap with PUCCH resource for transmitting the PN. Preferably in certain embodiments, PUCCH i and PUCCH j in the same TTI/slot does not overlap with each other (which is not shown in FIG. 8).

Figure 6:
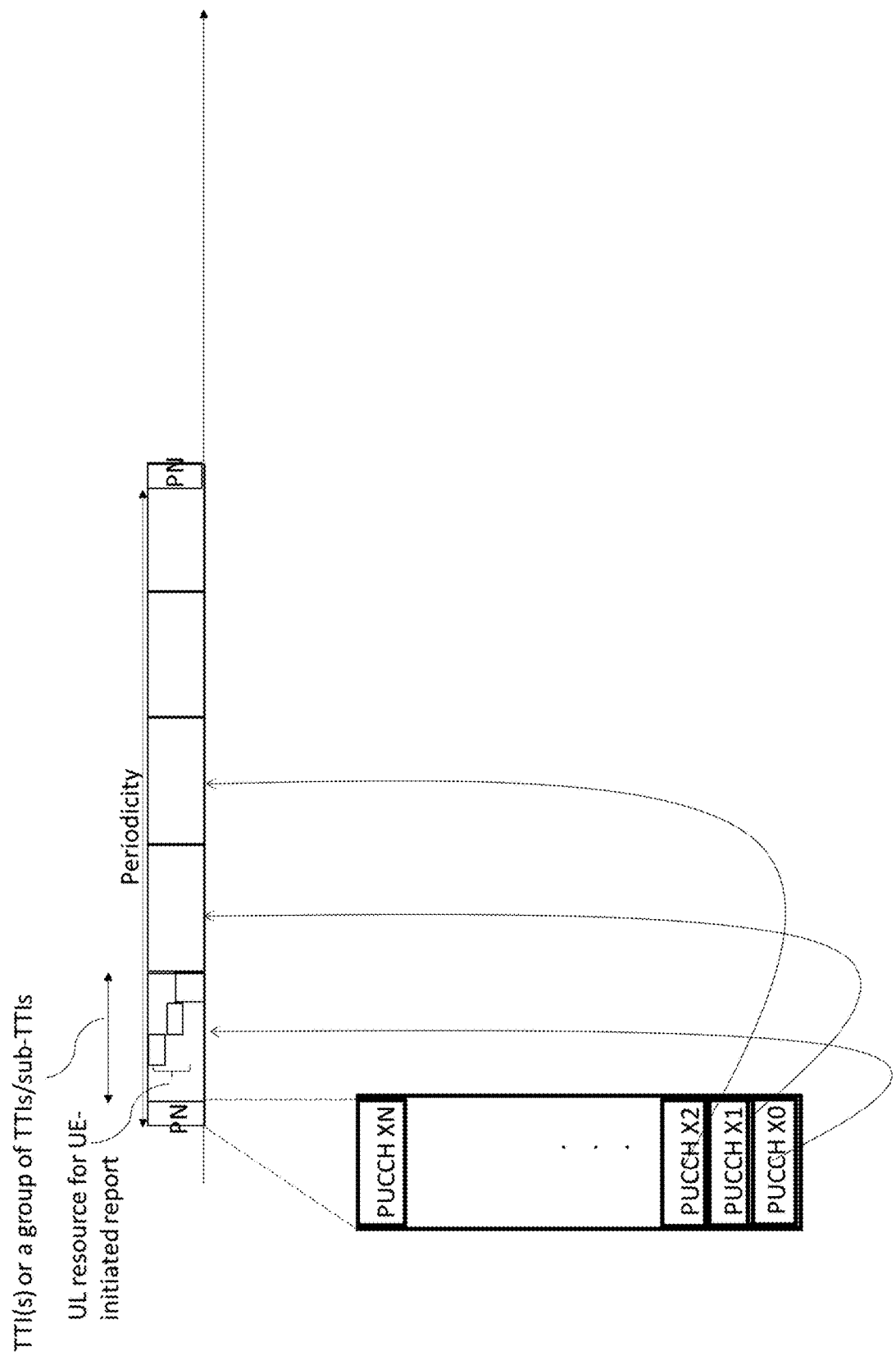
FIG. 6 is an example diagram showing PUCCH X0 corresponds to the 1-st TTI or 1-st group of TTI(s) or 1-st group of sub-TTI(s), in accordance with embodiments of the present invention.

Alternatively and/or preferably in certain embodiments, a time division method for the PN could be applied. The PN region could be configured in a periodic manner. As a same example, the PN region could be configured in TTI n, n+Z, n+2Z, n+3Z, . . . Functionality of PN is used to indicate usage of one or more TTIs within a time interval. In one example, the time interval could be configured in a logical index of TTI or a physical index of TTI. Preferably in certain embodiments, the logical index of TTI may mean the TTI with the UL resource associated with csi-reportconfig associated with UE-initiated or sub-configuration associated with UE-initiated or event. Preferably in certain embodiments, the physical index of TTI may mean the TTI in the time interval which may include the TTI with and without the UL resource associated with csi-reportconfig associated with UE-initiated or sub-configuration associated with UE-initiated or an event. Preferably in certain embodiments, granularity of the PN indication (e.g., how many TTIs or sub-TTIs are associated with one UL resource for the PN) could be configured. Preferably in certain embodiments, one UL resource for the PN could be used to indicate a number of TTIs or a number of sub-TTIs. Preferably in certain embodiments, the UL resource for PN x-y could map to a first group of TTIs/sub-TTIs, a second group of TTIs/sub-TTIs, and so on within a time interval. Preferably in certain embodiments, based on the UL resource PN x indicating used, a network node could identify or determine the UL resource in the first group of TTIs/sub-TTIs are used for the UE-initiated report. Preferably in certain embodiments, the UE could transmit (simultaneously) up to a number of UL resources for the PN in a PN region. Preferably in certain embodiments, the number of UL resource for the PN (simultaneously) being transmitted may be up to the UE's capability. Preferably in certain embodiments, prioritization could be applied when the UE would like to transmit a larger number of UL resources for the PN in a PN region. Preferably in certain embodiments, priority for each UL resources may depend on the highest priority associated with csi-reportconfig/sub-configuration or an event in each group of TTIs/sub-TTIs. Preferably in certain embodiments, the priority for one report associated with csi-reportconfig/sub-configuration may depend on the serving cell index, RS index, and/or csi-reportconfigID. Preferably in certain embodiments, the lower ID or index could correspond to higher priority. Preferably in certain embodiments, when there are more than one UL resources associated with csi-reportconfig/sub-configuration/event associated with the UE-initiated report in a group of TTIs/sub-TTIs, the highest priority of csi-reportconfig/sub-configuration/event will be used to determine priority of the group of TTIs/sub-TTIs (and thus as priority of the UL resource for the PN). Preferably in certain embodiments, priority for each UL resource may depend on the order of each group of TTIs/sub-TTIs. In one example, the earlier group of TTIs/sub-TTIs may have a higher priority than the latter group of TTIs/sub-TTIs. In an example, as shown in FIG. 6, PUCCH X0 corresponds to the 1-st TTI or 1-st group of TTI(s) or 1-st group of sub-TTI(s). When the UE transmits the PN via PUCCH X0, the UE could transmit the UE-initiated report on one or more UL resource(s) in the 1-st TTI or 1-st group of TTI(s) or 1-st group of sub-TTI(s). Preferably in certain embodiments, the UE may be based on whether there is a configured UL resource in the 1-st TTI or 1-ST group of TTI(s) or 1-st group of sub-TTI(s) which the configured UL resource is associated with a triggered event (and not cancelled) to determine a UL resource for the PN transmission. Preferably in certain embodiments, the UE could transmit more than one UL resources for the PN. Based on the indication of which resource, UL resource(s) configured for the UE-initiated resource could be available for transmitting the UE-initiated report, and/or the UE does not expect to be scheduled with overlapping with any one of configured UL resource(s) configured for the UE-initiated report. For the configured UL resource(s) in TTI or group of TTI(s) or group of sub-TTI(s) which is not indicated by the PN resource, the UE is not allowed to transmit or the UE does not transmit the UE-initiated report on any of the configured UL resource(s). In the example of FIG. 6, the UE could transmit both PUCCH X0 and X2 for indicating used of 1-st and 3-rd TTI/group of TTI(s)/group of sub-TTI(s). In FIG. 6, assume periodicity for the PN is 5 TTIs/group of TTIs/sub-TTIs. In the example of FIG. 6, the time interval could be illustrated as all TTIs associated with periodicity of the PN. Alternatively in certain embodiments, the time interval could only comprise the TTI/group of TTI/group of sub-TTI that has configured the UE resource(s) for the UE-initiated report. If the 4-th TTI/group of TTI/group of sub-TTI without comprising the UL configured resource for the UE-initiated report, the UE does not transmit the corresponding PN resource, and/or there is no such UL resource for the PN. In the example of FIG. 6, assume the 4-th and 5-th TTI/group of TTI/group of sub-TTI does not comprise UL resource(s) configured for the UE-initiated report. Preferably in certain embodiments, the UL resource(s) for the UE-initiated report means or corresponds that the UL resource(s) is configured or associated with at least one csi-reportconfig or sub-configuration associated with UE-initiated or an event.

Figure 7:
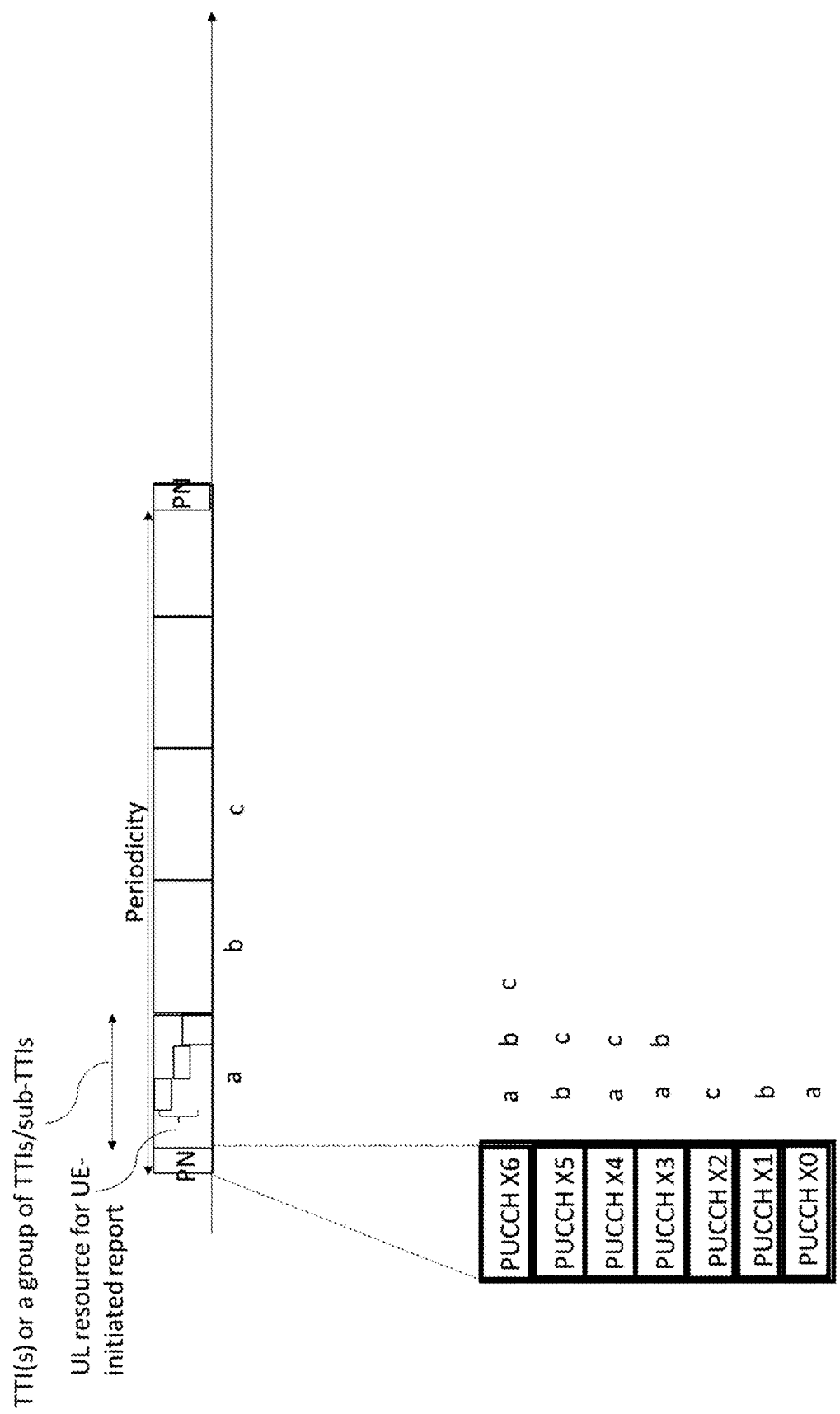
FIG. 7 is an example diagram showing the time interval could be 3 TTIs/groups of TTIs/groups of sub-TTIs denoted as a, b, c, or the time interval could be 5 TTIs/groups of TTIs/groups of sub-TTIs with only part of them with UL resource(s) configured for UE-initiated denoted as a, b, c, in accordance with embodiments of the present invention.
Figure 12:
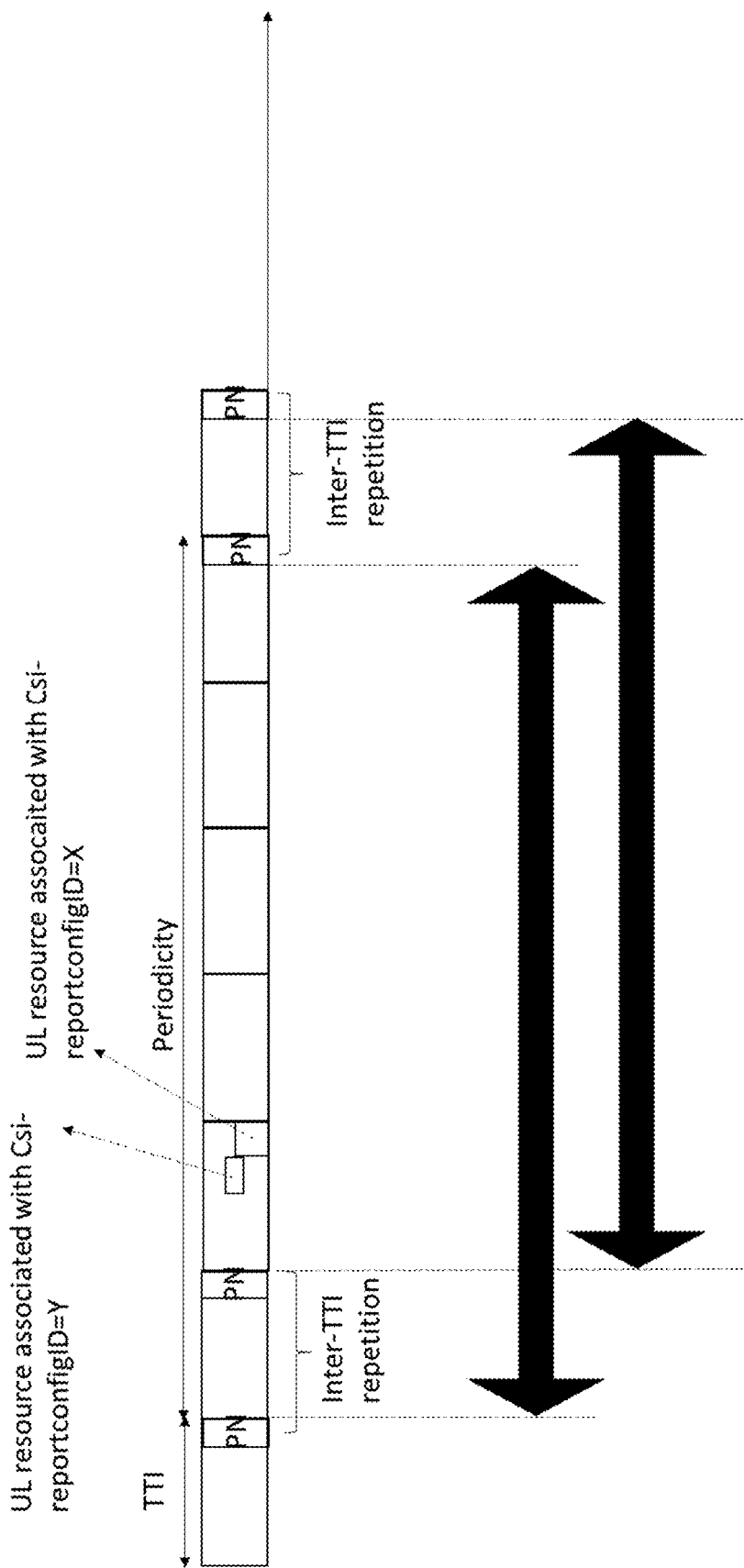
FIG. 12 is an example diagram showing that the UE could be configured with an inter-TTI (in different TTI) or intra-TTI (within a TTI) repetition for the UL resource for the PN, in accordance with embodiments of the present invention.

Alternatively and/or preferably in certain embodiments, UL resource selection for indicating usage of a number of TTIs could be applied. As the same example of the PN region occurring in slot n+Z, n+2Z, n+3Z . . . one or more UL resources for the PN is associated with a different combination (and/or a different number) of TTIs or sub-TTIs within a time interval. Preferably in certain embodiments, the UE, based on its triggered report and/or also associated UL resource, determines to indicate usage of the number of TTIs. Preferably in certain embodiments, the UE could be configured with one or more UL resources for the PN. Preferably in certain embodiments, the one or more UL resources for the PN could be one-to-one mapping to a first TTI, a second TTI, . . . a last TTI, (a first and a second TTI), (a first and a third TTI), . . . all TTIs within a time interval. Preferably in certain embodiments, when the UE does not have a triggered event, the UE does not transmit the PN. Preferably in certain embodiments, the UE could be configured with an association for one or each of UL resources for the PN and one combination of TTIs (in a time interval). Preferably in certain embodiments, the UE could be configured with an inter-TTI (in different TTI) or intra-TTI (within a TTI) repetition for the UL resource for the PN. FIG. 12 could show this example (inter-TTI repetition). Preferably in certain embodiments, consistent information should be indicated by the UL resource for the PN between at least two TTIs for inter-TTI. Preferably in certain embodiments, consistent information should be indicated by the UL resource for the PN between at least two TTIs for inter-TTI at least for overlapping TTIs (e.g., 3-rd-7-th TTI in this example). Preferably in certain embodiments, consistent information should be indicated by the UL resource for the PN between at least two TTIs for intra-TTI. Preferably in certain embodiments, the UE does not expect to be configured with a repetition for the UL resource for the PN (e.g., repetition for the UL resource for the PN should be one or absent). Preferably in certain embodiments, the UE does not apply an repetition or aggregation factor for the UL resource for the PN even if the UE is configured with a repetition or aggregation factor for the UL transmission. Preferably in certain embodiments, the UE transmits up to one UL resource for the PN. Preferably in certain embodiments, in response to the triggered event and the corresponding UL resource is within the combination of TTIs, the UE could determine a UL resource for the PN. In the example of FIG. 7, the time interval could be 3 TTIs/groups of TTIs/groups of sub-TTIs denoted as a, b, c, or the time interval could be 5 TTIs/groups of TTIs/groups of sub-TTIs with only part of them with UL resource(s) configured for UE-initiated denoted as a, b, c. PUCCH Xi could be used to indicate which combination of TTIs/group of TTIs/group of sub-TTIs is used. In this example, PUCCH X0-X6 could be used to indicate a, b, c, ab, ac, bc, abc. Based on the UE's actual need, the UE determines one PUCCH Xi for the PN transmission.

Alternatively and/or preferably in certain embodiments, the UE could be (additionally) configured with a second plurality of UL resources for the PN. Preferably in certain embodiments, the second plurality of UL resources for the PN re used to indicate usage of the UL resource for multiplexing more than one reports associated with more than one (triggered) events. Preferably in certain embodiments, when the UE determines to transmit the PN via the UL resource from the second plurality of UL resources, the UE does not transmit the PN via the UL resource from the first plurality of UL resources (e.g., originally the ones associated with the UL resource associated with event) and/or the UE skips or cancels the PN on the UL resource from the first plurality of UL resources.

Preferably and/or additionally in certain embodiments, the UE could be configured with a UE-specific ID offset or information offset when determining the UL resource for the PN. Preferably in certain embodiments, from the network node's view, a different UE could be configured with a different UE-specific ID offset or information offset for determining the UL resource for the PN.

Preferably in certain embodiments, (when the UE has one or more triggered events) the UE transmits one PN on one UL resource for indicating usage of one corresponding UL resource for transmitting the UE-initiated report, and preferably also with information of the number of triggered CSI-Reportconfigs/events/sub-configurations. An association between the UL resource for transmitting the PN and the UL resource for transmitting the UE-initiated report associated with a triggered event could depend on the number of triggered events, payload size of the UE-initiated report comprising one or more reports associated with one or more triggered events. An association between the UL resource for transmitting the PN and the UL resource for transmitting the UE-initiated report associated with one or more triggered events could be one-to-one or multiple-to-one.

Preferably in certain embodiments, (when the UE has one or more triggered events) the UE transmits more than one PNs, wherein each PN is transmitted on one UL resource, respectively, for indicating usage of each UL resource for transmitting the UE-initiated report. There is an association between the UL resource for transmitting the PN, the UL resource for transmitting the UE-initiated report associated with a triggered event, triggered event, serving cell (ID), and/or CSI-Reportconfig (ID). The association may be based on a configuration, MAC CE, Downlink Control Information (DCI) for indicating to the UE. Depending on which event is triggered, the UE determines to transmit the PN on the corresponding UL resource. Preferably in certain embodiments, the UL resource for transmitting the PN for a different event will be multiplexed in a different PUCCH resource in a Frequency Division Multiplexing (FDM) manner, TDM, and/or Code Division Multiplexing (CDM) manner (e.g., using a different cyclic shift or orthogonal sequence). In one case, as shown in FIG. 5, PUCCH1, 2, 3 for transmitting the report associated with a different triggered event is separately configured. The different event's UL resource for transmitting UE-initiated report is configured without overlapping in time domain. In this sense, when the UE has 2 triggered events, the UE will transmit two PUCCH Xi and corresponding PUCCH resources for the UE-initiated report associated with the triggered event, respectively.

Preferably in certain embodiments, (when the UE has one or more triggered events) the UE transmits one PN on one UL resource for indicating usage of a plurality of UL resources for transmitting the UE-initiated report. Preferably in certain embodiments, the UL resource for the PN could be per-UE or UE-dedicated to the UE. Preferably in certain embodiments, the one PN on one UL resource could activate to use a plurality of UL resources in a TTI. Preferably in certain embodiments, the one PN on one UL resource could activate to use a plurality of UL resources during a time period. Preferably in certain embodiments, a time period is periodicity of the PN resource. Preferably in certain embodiments, when there is a configured UL resource for transmitting the UE-initiated report during the time period, once the UE transmits the time period, the UE could transmit the UE-initiated report on the configured UL resource. Preferably in certain embodiments, the plurality of UL resources are in a same TTI as the one UL resource of the one PN. Preferably in certain embodiments, the plurality of UL resources are in a different TTI as the one UL resource of the one PN.

A list of UL resource for transmitting the UE-initiated report associated with more than one triggered events or more than one CSI-reportconfigs or more than one PUCCH resources associated with more than one CSI-reportconfigs. When the UE would transmit one UE-initiated report associated with more than one triggered events or more than one CSI-reportconfigs or more than one PUCCH resources associated with more than one CSI-reportconfigs, the UE would multiplex the report/content/information associated with the more than one triggered events in one or more UL resources in the list. Preferably in certain embodiments, the list is dedicated for UE-initiated reporting. Preferably in certain embodiments, the list is dedicated for the UE transmitting multiple reports associated with more than one events or csi-reportconfigs. When the UE would transmit one UE-initiated report associated with a single triggered event, the UE will transmit the one UE-initiated report via the UL resource associated with the single triggered event. Preferably in certain embodiments, when the UE would transmit a first UE-initiated report associated with a first single triggered event and a second UE-initiated report associated with a second single triggered event and a first UL resource associated with the first triggered event is in a first TTI and a second UL resource associated with the second triggered event is in a second TTI, the UE will transmit the first one UE-initiated report via the first UL resource associated with the first single triggered event in the first TTI and transmit the second one UE-initiated report via the second UL resource associated with the second single triggered event in the second TTI. Preferably in certain embodiments, based on an association between the UL resource for transmitting one or more PNs and the first UL resource and the second UL resource for transmitting the UE-initiated report, the UE could transmit a first PN for the first UL resource and a second PN for the second UL resource.

Preferably in certain embodiments, the UE may have or be configured with a first list of UL resources. Preferably in certain embodiments, the first list of UL resources is used for transmitting at least multiple CSIs which is NOT associated with the UE-initiated report or not associated with the UE initiated event. Preferably in certain embodiments, the multiple CSIs are associated with the network triggered report (e.g., (report quantity of or time domain behavior of) csi-reportconfig is NOT associated with UE-initiated).

Preferably in certain embodiments, one limitation is to avoid multiplexing the UE-initiated report and the UCI triggered by the network node in the same TTI or in the same instance or in the same resource. More specifically, csi-reportconfig associated with the UE-initiated report and csi-reportconfig associated with the network node triggered will be configured in a different TTI. In one example, the UL resource for carrying csi-reportconfig associated with the network node triggered is configured in a different TTI than the UL resource for carrying csi-reportconfig associated with the UE-initiated report. Preferably in certain embodiments, the UE does not expect to transmit an aperiodic report comprising both the UE-initiated report and the network node report. Preferably in certain embodiments, the UE does not expect to be configured with a triggering state being associated with csi-reportconfig which is associated with the UE-initiated report.

For UL resource(s) configured for transmitting the UL-initiated report, if the UE does not transmit the PN associated with the UL resource(s) or the UE transmits the PN indicating not used, the UE does not perform transmission on the UL resource(s) (except the UE receives indication/configuration/signal indicating DL/UL transmission on the UL resource(s)).

Preferably in certain embodiments, information of one or more CSI-reportconfigIDs will be reported in a UE-initiated report.

Preferably in certain embodiments, information of one CSI-reportconfigID associated with triggered event will be reported in a UE-initiated report.

Preferably in certain embodiments, when there are more than one reports (which are associated with UE-initiated (rather than network node trigger)) in a UE-initiated report, the UE will include information of one or more CSI-reportconfigIDs in the UE-initiated report.

Preferably in certain embodiments, the UE could be based on a configuration to configure to use MAC CE or UCI to transmit the UE-initiated report.

Preferably in certain embodiments, a first event (e.g., event-1, 2, 3, 4) is allowed to be configured with MAC CE or UCI for transmitting the UE-initiated report.

Preferably in certain embodiments, a first event (e.g., event-1) is allowed to be configured with MAC CE or UCI for transmitting the UE-initiated report.

Preferably in certain embodiments, a second event (e.g., event-2, 3, or 4) is restricted to be configured with UCI for transmitting the UE-initiated report.

Preferably in certain embodiments, a first event (e.g., event-1) is restricted to be configured with MAC CE for transmitting the UE-initiated report.

Preferably in certain embodiments, a second event (e.g., event-2, 3, or 4) is allowed to be configured with MAC CE or UCI for transmitting the UE-initiated report.

Preferably in certain embodiments, based on triggering timing and the next available UL resource for transmitting the UE-initiated report (and whether there is an available UL grant for transmitting the UE-initiated report), the UE could determine whether to use MAC CE or UCI for transmitting the UE-initiated report.

Preferably in certain embodiments, when the next available UL resource for transmitting the UE-initiated report is larger than a threshold (and there is an available UL grant for transmitting the UE-initiated report), the UE transmits the UE-initiated report via MAC CE. Preferably in certain embodiments, when the next available UL resource for transmitting the UE-initiated report is smaller than a threshold (or there is no available UL grant for transmitting the UE-initiated report), the UE transmits the UE-initiated report via UCI.

Preferably in certain embodiments, once the UE transmits the UE-initiated report via UCI, the UE transmits the PN first for indicating/notifying usage of UL resources of UCI.

Preferably in certain embodiments, the UE transmits up to a number of PNs simultaneously on a cell.

Preferably in certain embodiments, the UE will prioritize the transmit power of one or more PNs or prioritize to select one or more PNs, which the one or more PNs are associated with higher priority. Preferably in certain embodiments, priority could be determined based on cell ID of DL RS (for measurement), RSRP, and/or CSI-ReportconfigID. Preferably in certain embodiments, priority could be determined based on an event type. In one example, event-1 may have lower priority than event-2. When one sub-configuration is associated with one event, priority of one or more PNs could be determined based on a sub-configuration ID.

Preferably in certain embodiments, priority of one or more PNs could be replaced by priority of one or more PUCCHs for the UE-initiated report in a TTI. Preferably in certain embodiments, priority of one or more PUCCHs for the UE-initiated report in a TTI could be used to determine for power allocation and/or UCI dropping to meet a container size (e.g., PUCCH format, PUCCH resource).

Various examples and embodiments of the present invention are described below. For the methods, alternatives, concepts, examples, and embodiments detailed above and herein, the following aspects and embodiments are possible.

Figure 13:
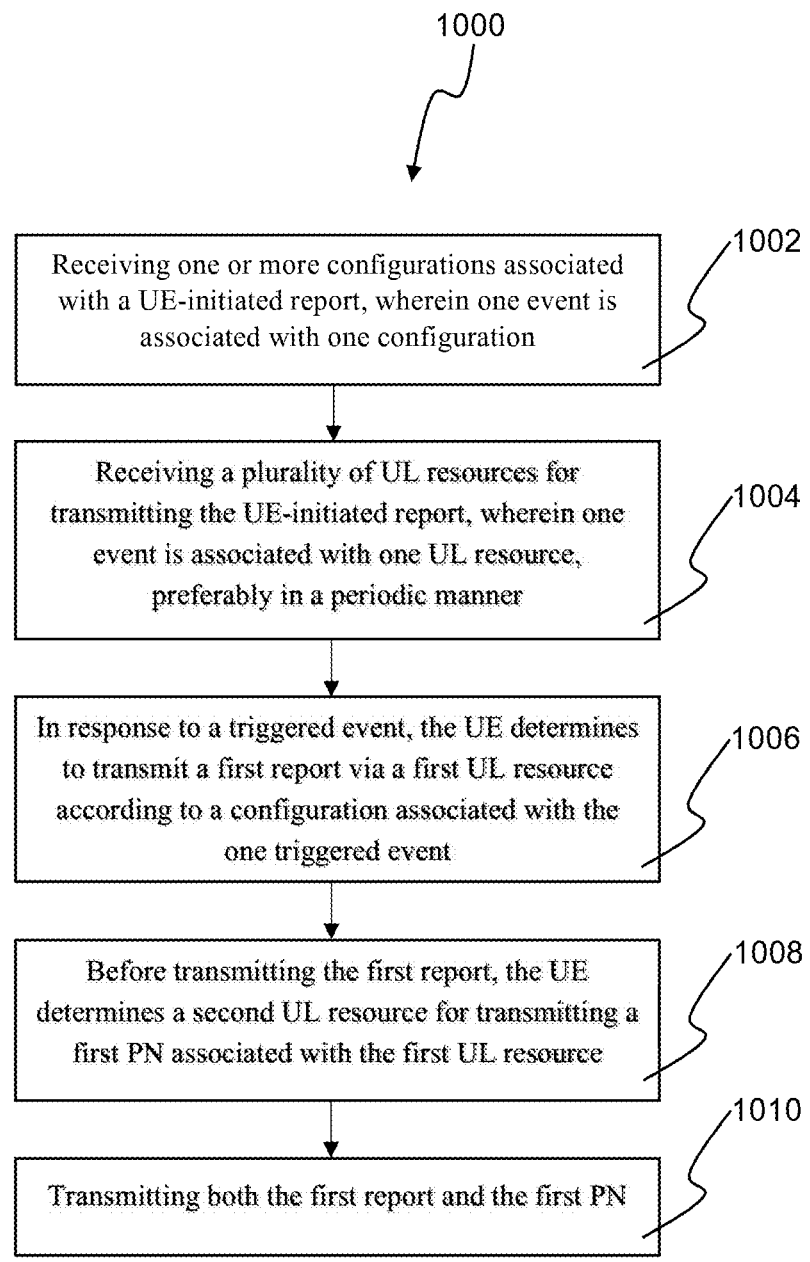
FIG. 13 is a flow diagram of a method of a UE in a wireless communication system comprising receiving one or more configurations associated with a UE-initiated report, receiving a plurality of UL resources for transmitting the UE-initiated report, in response to a triggered event, the UE determines to transmit a first report via a first UL resource according to a configuration associated with the one triggered event, before transmitting the first report, the UE determines a second UL resource for transmitting a first PN associated with the first UL resource, and transmitting both the first report and the first PN, in accordance with embodiments of the present invention.

Referring to FIG. 13, with this and other concepts, systems, and methods of the present invention, a method 1000 for a UE in a wireless communication system comprises receiving one or more configurations associated with a UE-initiated report, wherein one event is associated with one configuration (step 1002), receiving a plurality of UL resources for transmitting the UE-initiated report, wherein one event is associated with one UL resource, preferably in a periodic manner (step 1004), in response to a triggered event, the UE determines to transmit a first report via a first UL resource according to a configuration associated with the one triggered event (step 1006), before transmitting the first report, the UE determines a second UL resource for transmitting a first PN associated with the first UL resource (step 1008), and transmitting both the first report and the first PN (step 1010).

Preferably in certain embodiments, an association between the first UL resource and the second UL resource is configured by an RRC configuration (which is the same as or different than the one or more configurations associated with the UE-initiated report) or MAC CE or DCI.

Preferably in certain embodiments, an association between the first UL resource and the second UL resource is based on the most recent PN region before the first UL resource.

Preferably in certain embodiments, the first UL resource will have a time gap to the second UL resource.

Preferably in certain embodiments, the UE is configured with a TTI offset to determine the second UL resource.

Preferably in certain embodiments, at least one event is triggered, the UE transmits the PN.

Preferably in certain embodiments, when no event is triggered, the UE does not transmit the PN.

Preferably in certain embodiments, resource-based association or TTI-based association for the UL resource for the PN and the UL resource for the UE-initiated report could be applied.

Preferably in certain embodiments, the UE is configured with non-overlapped UL resources for the UE-initiated report in a TTI.

Preferably in certain embodiments, the UL resource for transmitting the PN in a PN region could be multiplexed in different PRBs (frequency domain) or different cyclic shifts (code-domain).

Preferably in certain embodiments, the UL resource for transmitting the PN in a PN region could have time overlapping UL resources for transmitting the PN.

Preferably in certain embodiments, the UE is configured with a second plurality of UL resources for multiplexing more than one triggered reports.

Preferably in certain embodiments, a second set of UL resources will be configured associated with the second plurality of UL resources.

Preferably in certain embodiments, based on a number of triggered events or a number of pending (UE-initiated) reports, the UE determines to transmit the PN and the UE-initiated report based on one configuration or configuration of the second plurality of UL resources for multiplexing more than one triggered reports.

Preferably in certain embodiments, based on which TTI is being associated with the configured UL resource for the triggered event (or configuration), the UE determines a corresponding UL resource for the PN (to indicate used of corresponding TTI).

Preferably in certain embodiments, a different UL resource could (implicitly) indicate information of a combination of triggered events/reports or a number of triggered events/reports.

Preferably in certain embodiments, the UE, based on a number of triggered events, determines a UL resource for the PN, wherein the UL resource for the PN is associated with information of combination of triggered events or the number of triggered events.

Preferably in certain embodiments, the UE does not expect periodicity for the UL resource associated with any configuration associated with UE-initiated is smaller than periodicity for the PN region.

Preferably in certain embodiments, the UE does not expect during two consecutive PN regions, there are more than one UL resources associated with the same configuration for UE-initiated (i.e., one csi-reportconfig associated with UE-initiated is associated with one UL resource within a time periodicity).

Preferably in certain embodiments, the UE does not expect to be simultaneously configured with both UE-initiated report configurations and slot repetitions or aggregation factors, and/or the UE does not apply the aggregation factor for the UL resource associated with the UE-initiated report.

Preferably in certain embodiments, based on the repetition number of aggregation factors, one periodicity of the PN comprises inter-slot repetition for one UL resource associated with the same configuration for UE-initiated.

Preferably in certain embodiments, one configuration corresponds to one csi-reportconfig.

Preferably in certain embodiments, the one or more configurations are applied or configured to perform in a first serving cell (e.g., primary cell).

Preferably in certain embodiments, one configuration could be associated with a measurement result from a second serving cell which is different than a first serving cell.

Preferably in certain embodiments, the UE does not expect to be configured with or indicated with the same TTI to transmit both the network node triggered report and the UE-initiated report.

Preferably in certain embodiments, the UE does not expect to be configured with the PN region to overlap with the UL resource for the UE-initiated report and/or the network node triggered report.

Preferably in certain embodiments, the PN region could be configured in the same TTI as the network node triggered report.

Preferably in certain embodiments, the UE does not multiplex the PN with the network node triggered report.

Preferably in certain embodiments, the network node triggered report comprises UCI associated with csi-reportconfig which is network node triggered (legacy NR Rel-15, 16, 17, or 18) or Hybrid Automatic Repeat Request (HARQ) associated with Uu interface or PC5 interface.

Preferably in certain embodiments, PUCCH format 0 is used to deliver the PN.

Preferably in certain embodiments, the UE reports a capability to indicate a first number of simultaneously transmitted PNs in a PN region.

Preferably in certain embodiments, if the UE has a second number of triggered reports to be transmitted (and there are the second number of PNs to be transmitted in a PN region), the UE prioritizes to transmit or prioritize to allocate transmit power to a third number of PNs in a PN region, wherein the third number is equal to or smaller than the first number.

Preferably in certain embodiments, the third number of PNs is determined based on a time order, eventID, csi-reportconfigID, sub-configurationID, event type, and/or serving cell ID.

Preferably in certain embodiments, for deprioritized PNs, the UE drops or cancels corresponding triggering events, or the UE triggers SR for UL transmission, and/or the UE-initiated report is delivered on MAC CE (after/in response to de-prioritization).

Preferably in certain embodiments, if the UE has a second number of triggered reports to be transmitted (and there are the second number of PNs to be transmitted in a PN region), the UE determines to transmit the PN associated with UL resources for multiplexing more than one triggered events.

Referring back to FIGS. 3 and 4, in one or more embodiments from the perspective of a device (e.g., a UE) in a wireless communication system, the device 300 includes a program code 312 stored in memory 310 of the transmitter. The CPU 308 could execute program code 312 to: (i) receive one or more configurations associated with a UE-initiated report, wherein one event is associated with one configuration; (ii) receive a plurality of UL resources for transmitting the UE-initiated report, wherein one event is associated with one UL resource, preferably in a periodic manner; (iii) in response to a triggered event, the UE determines to transmit a first report via a first UL resource according to a configuration associated with the one triggered event; (iv) before transmitting the first report, the UE determines a second UL resource for transmitting a first PN associated with the first UL resource; and (v) transmit both the first report and the first PN. Moreover, the CPU 308 can execute the program code 312 to perform all of the described actions, steps, and methods described above, below, or otherwise herein.

It is noted that any of the methods, alternatives, steps, examples, and embodiments proposed herein may be applied independently, individually, simultaneously, and/or with multiple methods, alternatives, steps, examples, and embodiments combined together.

Figure 14:
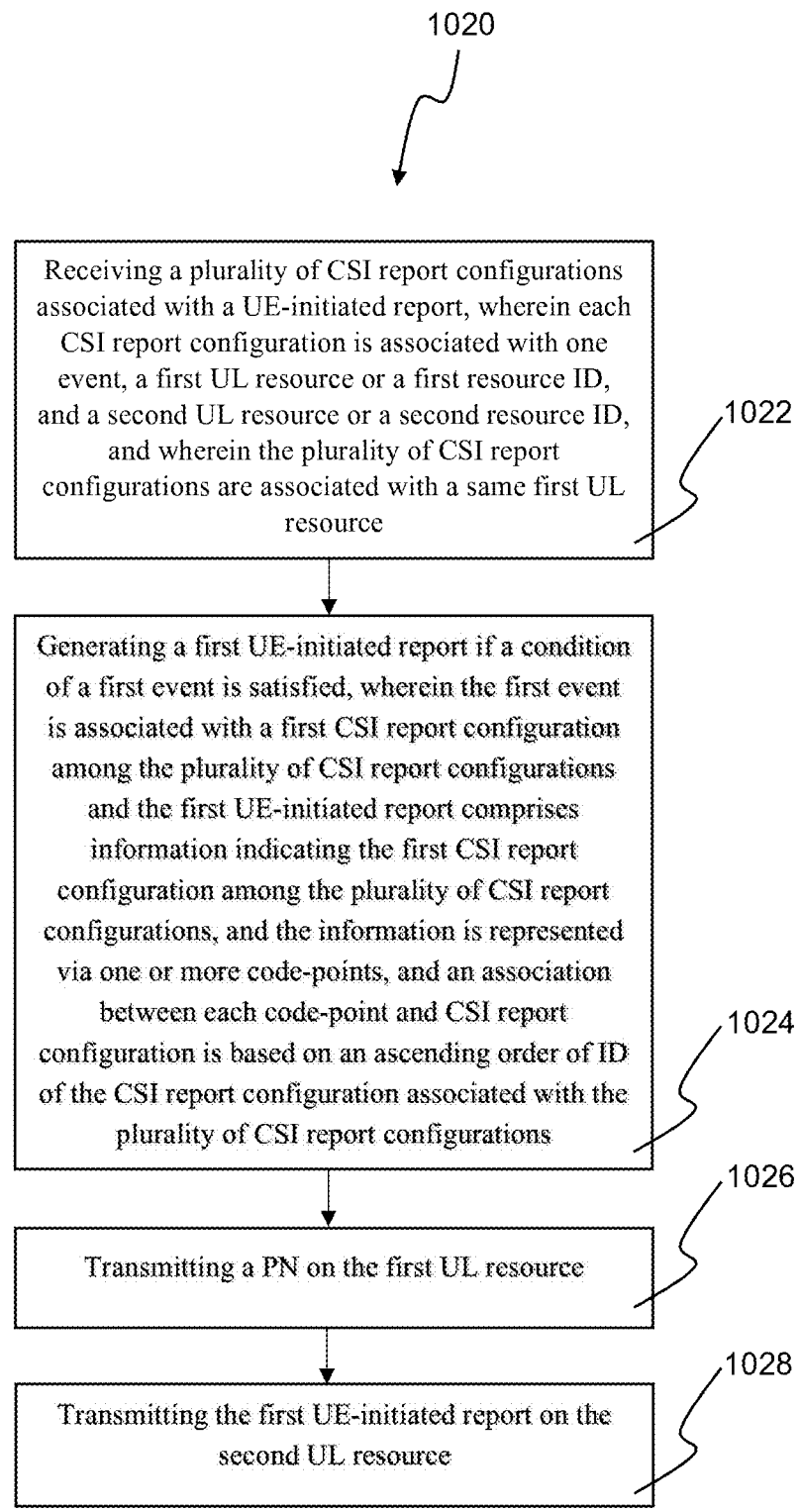
FIG. 14 is a flow diagram of a method of a UE in a wireless communication system receiving a plurality of CSI report configurations associated with a UE-initiated report, generating a first UE-initiated report if a condition of a first event is satisfied, transmitting a PN on the first UL resource, and transmitting the first UE-initiated report on the second UL resource, in accordance with embodiments of the present invention.

Referring to FIG. 14, with this and other concepts, systems, and methods of the present invention, a method 1020 for a UE in a wireless communication system comprises receiving a plurality of CSI report configurations associated with a UE-initiated report, wherein each CSI report configuration is associated with one event, a first UL resource or a first resource ID, and a second UL resource or a second resource ID, and wherein the plurality of CSI report configurations are associated with a same first UL resource (step 1022), generating a first UE-initiated report if a condition of a first event is satisfied, wherein the first event is associated with a first CSI report configuration among the plurality of CSI report configurations and the first UE-initiated report comprises information indicating the first CSI report configuration among the plurality of CSI report configurations, and the information is represented via one or more code-points, and an association between each code-point and CSI report configuration is based on an ascending order of ID of the CSI report configuration associated with the plurality of CSI report configurations (step 1024), transmitting a PN on the first UL resource (step 1026), and transmitting the first UE-initiated report on the second UL resource (step 1028).

In various embodiments, the plurality of CSI report configurations are configured for a same first serving cell, and/or if the plurality of CSI report configurations are configured for a same first serving cell, the plurality of CSI report configurations share the same first UL resource.

In various embodiments, when at least one event among multiple events associated with the plurality of CSI report configurations is triggered, the UE transmits the PN on the first UL resource.

In various embodiments, when there is no event associated with the plurality of CSI report configurations being triggered, the UE does not transmit on the first UL resource.

In various embodiments, the UE receives a second CSI report configuration, wherein the second CSI report is associated with a second event, a third UL resource or a third resource ID, and a fourth UL resource or a fourth resource ID, and/or the second CSI report configuration is not belonging to the plurality of CSI report configuration, and/or the second CSI report configuration is configured for a second serving cell, and/or the third UL resource is only associated with the second CSI report configuration, and/or if the second CSI report configuration is configured for a second serving cell which is different than the first serving cell, the third UL resource is configured different than the first UL resource.

In various embodiments, if a condition of the second event is satisfied, the UE generates a second UE-initiated report, wherein the second UE-initiated report does not comprise information indicating the second CSI report configuration, and/or the UE transmits the PN on the third UL resource and transmits the second UE-initiated report on the fourth UL resource.

In various embodiments, the first UL resource and the third UL resource correspond to a PUCCH resource, and/or the second UL resource and the fourth UL resource correspond to a PUSCH resource.

In various embodiments, there is one-to-one mapping between the first UL resource and the second UL resource, and/or the first UL resource and the second UL resource are configured with a same periodicity.

In various embodiments, there is one-to-one mapping between the third UL resource and the fourth UL resource, and/or the third UL resource and the fourth UL resource are configured with a same periodicity.

In various embodiments, the UE does not expect to be simultaneously configured with both a UL resource associated with the UE-initiated report and a slot repetition or an aggregation factor, and/or the UE does not apply an aggregation factor for a UL resource associated with the UE-initiated report.

In various embodiments, the first UL resource is used to indicate usage of the second UL resource.

In various embodiments, the first UE-initiated report transmitted on the second UL resource is via UCI.

In various embodiments, if more than one events associated with the plurality of CSI report configurations are triggered, the UE determines one UE-initiated report to be transmitted on the second UL resource among the more than one events.

In various embodiments, if more than one events associated with the plurality of CSI report configurations are triggered, the UE determines one UE-initiated report to be transmitted on the second UL resource based on priority of each of the plurality of CSI report configurations, and/or priority of each of the plurality of CSI report configurations is based on an ID of the CSI report configuration, and/or a lower ID of the CSI report configuration corresponds to a higher priority.

In various embodiments, the first UE-initiated report comprises one or more DL RS resource indicators and a corresponding L1-RSRP.

In various embodiments, the one event corresponds to any of: Event-1=quality of a current beam is worse than a certain threshold, Event-2=quality of at least one new beam, such as L1-RSRP, becomes a threshold value better than the current beam, Event-3=quality of a new beam is better than a certain threshold, or Event-4=quality of the current beam is worse than a threshold 1, and quality of the at least one new beam is better than a threshold 2.

Referring back to FIGS. 3 and 4, in one or more embodiments from the perspective of a device (e.g., a UE) in a wireless communication system, the device 300 includes a program code 312 stored in memory 310 of the transmitter. The CPU 308 could execute program code 312 to: (i) receive a plurality of CSI report configurations associated with a UE-initiated report, wherein each CSI report configuration is associated with one event, a first UL resource or a first resource ID, and a second UL resource or a second resource ID, and wherein the plurality of CSI report configurations are associated with a same first UL resource; (ii) generate a first UE-initiated report in response to a condition of a first event is satisfied, wherein the first event is associated with a first CSI report configuration among the plurality of CSI report configurations and the first UE-initiated report comprises information indicating the first CSI report configuration among the plurality of CSI report configurations, and the information is represented via one or more code-points, and an association between each code-point and CSI report configuration is based on an ascending order of ID of the CSI report configuration associated with the plurality of CSI report configurations; (iii) transmit a PN on the first UL resource; (iv) and transmit the first UE-initiated report on the second UL resource. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
receiving a plurality of Channel State Information (CSI) report configurations, in a first serving cell, associated with a UE-initiated report, wherein each CSI report configuration is associated with single event, a first Uplink (UL) resource or a first resource Identity (ID), and a second UL resource or a second resource ID, and wherein the plurality of CSI report configurations are associated with a same first UL resource;
receiving a second CSI report configuration in a second serving cell, wherein:
the second CSI report configuration is associated with a second event, a third UL resource or a third resource ID, and a fourth UL resource or a fourth resource ID, and/or
the second CSI report configuration does not belong to the plurality of CSI report configurations, wherein when the second serving cell is different than the first serving cell, the third UL resource is configured to be different than the first UL resource;
generating a first UE-initiated report if a condition of a first event is satisfied, wherein the first event is associated with a first CSI report configuration among the plurality of CSI report configurations and the first UE-initiated report comprises information indicating the first CSI report configuration among the plurality of CSI report configurations, and the information is represented via one or more code-points, and an association between each code-point and CSI report configuration is based on an ascending order of ID of the CSI report configuration associated with the plurality of CSI report configurations;
transmitting a Pre-Notification (PN) on the first UL resource; and
transmitting the first UE-initiated report on the second UL resource.

2. The method of claim 1, wherein at least one of: the plurality of CSI report configurations are configured for a same first serving cell, or when the plurality of CSI report configurations are configured for the same first serving cell, the plurality of CSI report configurations share the same first UL resource.

3. The method of claim 1, wherein when at least one event among multiple events associated with the plurality of CSI report configurations is triggered, the UE transmits the PN on the first UL resource.

4. The method of claim 1, wherein when there is no event associated with the plurality of CSI report configurations being triggered, the UE does not transmit on the first UL resource.

5. The method of claim 2, wherein at least one of:
the second CSI report configuration is configured for the second serving cell, or
the third UL resource is only associated with the second CSI report configuration.

6. The method of claim 5, wherein at least one of:
when a condition of the second event is satisfied, the UE generates a second UE-initiated report, wherein the second UE-initiated report does not comprise information indicating the second CSI report configuration, or
the UE transmits the PN on the third UL resource and transmits the second UE-initiated report on the fourth UL resource.

7. The method of claim 5, wherein at least one of:
the first UL resource and the third UL resource correspond to a Physical Uplink Control Channel (PUCCH) resource, or
the second UL resource and the fourth UL resource corresponds to a Physical Uplink Shared Channel (PUSCH) resource.

8. The method of claim 5, wherein at least one of:
there is one-to-one mapping between the first UL resource and the second UL resource, the first UL resource and the second UL resource are configured with a same periodicity, wherein there is one-to-one mapping between the third UL resource and the fourth UL resource, or the third UL resource and the fourth UL resource are configured with a same periodicity.

9. The method of claim 1, wherein the first UL resource is used to indicate usage of the second UL resource.

10. The method of claim 1, wherein the first UE-initiated report transmitted on the second UL resource is via Uplink Control Information (UCI).

11. The method of claim 1, wherein when more than one events associated with the plurality of CSI report configurations are triggered, the UE determines one UE-initiated report to be transmitted on the second UL resource among the more than one events.

12. The method of claim 11, wherein at least one of: the determination is based on priority of each of the plurality of CSI report configurations, or priority of each of the plurality of CSI report configurations is based on an ID of the CSI report configuration, or a lower ID of the CSI report configuration corresponds to a higher priority.

13. The method of claim 1, wherein the first UE-initiated report comprises one or more Downlink (DL) Reference Signal (RS) resource indicators and a corresponding Layer 1 (L1)-Reference Signal Received Power (RSRP).

14. The method of claim 1, wherein the one event corresponds to any of:
Event-1, wherein quality of a current beam is lower than a certain threshold,
Event-2, wherein quality of at least one new beam, such as L1-RSRP, becomes a threshold value greater than the current beam,
Event-3, wherein quality of a new beam is greater than a certain threshold, or
Event-4, wherein quality of the current beam is lower than a threshold 1, and quality of the at least one new beam is greater than a threshold 2.

15. A User Equipment (UE), comprising:
a memory; and
a processor operatively connected to the memory, wherein the processor is configured to execute a program code to:
receive a plurality of Channel State Information (CSI) report configurations, in a first serving cell, associated with a UE-initiated report, wherein each CSI report configuration is associated with single event, a first Uplink (UL) resource or a first resource Identity (ID), and a second UL resource or a second resource ID, and wherein the plurality of CSI report configurations are associated with a same first UL resource;

receive a second CSI report configuration in a second serving cell, wherein:
  the second CSI report configuration is associated with a second event, a third UL resource or a third resource ID, and a fourth UL resource or a fourth resource ID, and/or
  the second CSI report configuration does not belong to the plurality of CSI report configurations, wherein when the second serving cell is different than the first serving cell, the third UL resource is configured to be different than the first UL resource;
generate a first UE-initiated report if a condition of a first event is satisfied, wherein the first event is associated with a first CSI report configuration among the plurality of CSI report configurations and the first UE-initiated report comprises information indicating the first CSI report configuration among the plurality of CSI report configurations, and the information is represented via one or more code-points, and an association between each code-point and CSI report configuration is based on an ascending order of ID of the CSI report configuration associated with the plurality of CSI report configurations;
transmit a Pre-Notification (PN) on the first UL resource; and
transmit the first UE-initiated report on the second UL resource.

16. The UE of claim 15, wherein a least one of: the plurality of CSI report configurations are configured for the same first serving cell, or when the plurality of CSI report configurations are configured for the same first serving cell, the plurality of CSI report configurations share the same first UL resource.

17. The UE of claim 15, wherein when at least one event among multiple events associated with the plurality of CSI report configurations is triggered, the UE transmits the PN on the first UL resource.

18. The UE of claim 15, wherein when there is no event associated with the plurality of CSI report configurations being triggered, the UE does not transmit on the first UL resource.

19. The UE of claim 16, wherein at least one of:
the second CSI report configuration is configured for the second serving cell, or
the third UL resource is only associated with the second CSI report configuration.

20. The UE of claim 19, wherein at least one of:
when a condition of the second event is satisfied, the UE generates a second UE-initiated report, wherein the second UE-initiated report does not comprise information indicating the second CSI report configuration, or
the UE transmits the PN on the third UL resource and transmits the second UE-initiated report on the fourth UL resource.

* * * * *